United States Patent
Brosowske et al.

(10) Patent No.: US 8,225,689 B2
(45) Date of Patent: Jul. 24, 2012

(54) COMPLIANT GEAR ASSEMBLY, ENGINE AND GEAR TRAIN OPERATING METHOD

(75) Inventors: Thomas A. Brosowske, Peoria, IL (US); Aaron J. Weber, Morton, IL (US); Scott A. Snoble, Pekin, IL (US); Thomas L. Atwell, Peoria, IL (US); Joseph R. Derk, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 674 days.

(21) Appl. No.: 12/378,907

(22) Filed: Feb. 20, 2009

(65) Prior Publication Data

US 2009/0217779 A1 Sep. 3, 2009

Related U.S. Application Data

(63) Continuation-in-part of application No. 11/493,982, filed on Jul. 27, 2006, now Pat. No. 7,658,124.

(51) Int. Cl.
*F16H 55/18* (2006.01)
*F16H 55/14* (2006.01)

(52) U.S. Cl. ............... 74/440; 74/409; 74/411; 74/443; 74/399; 74/397

(58) Field of Classification Search .............. 74/392, 74/395, 396, 409, 411, 440, 443, 397, 398, 74/399
See application file for complete search history.

(56) References Cited

U.S. PATENT DOCUMENTS

| | | | |
|---|---|---|---|
| 1,847,611 A | * | 3/1932 | Hodgkinson ............... 74/410 |
| 2,307,129 A | | 1/1943 | Hines et al. |
| 2,918,826 A | | 12/1959 | Miller |
| 2,992,532 A | * | 7/1961 | Miller ............... 60/413 |

(Continued)

FOREIGN PATENT DOCUMENTS

DE 1 450 895 10/1971

(Continued)

OTHER PUBLICATIONS

PCT International Search Report; PCT/US2007/012633; Filing Date: May 25, 2007; Applicant: Caterpillar Inc.

*Primary Examiner* — William C Joyce
*Assistant Examiner* — Terence Boes
(74) *Attorney, Agent, or Firm* — Liell & McNeil

(57) ABSTRACT

A compliant gear assembly for a gear train of an internal combustion engine includes a hub subassembly having a first hub component and a second hub component. The first hub component defines a first axis, and the compliant gear assembly includes a gear ring rotatable relative to the hub subassembly and defining a gear ring axis of rotation. The second hub component is movable relative to the first hub component in a direction normal to the first axis between a first stop position at which the gear ring axis of rotation is co-linear with the first axis and a second stop position at which the gear ring axis of rotation is parallel to but not co-linear with the first axis. A compliance mechanism is coupled between the first hub component and the second hub component and biases the second hub component toward the first stop position. Translating the second hub component relative to the first hub component in a direction normal to the first axis attenuates torque spikes induced for example via fuel injector actuation and/or cylinder firing in an engine gear train employing the compliant gear assembly.

16 Claims, 14 Drawing Sheets

U.S. PATENT DOCUMENTS

| | | | |
|---|---|---|---|
| 4,072,064 A | 2/1978 | Lloyd et al. | |
| 4,674,351 A | 6/1987 | Byrd | |
| 4,831,897 A | 5/1989 | Dobbs | |
| 5,170,676 A | 12/1992 | Matouka et al. | |
| 5,452,622 A | 9/1995 | Fenelon | |
| 5,540,112 A | 7/1996 | Baker et al. | |
| 5,685,197 A | 11/1997 | Baker et al. | |
| 5,870,928 A | 2/1999 | Genter et al. | |
| 5,979,259 A | 11/1999 | Shook et al. | |
| 5,979,260 A | 11/1999 | Long et al. | |
| 6,021,686 A | 2/2000 | Mizoguchi | |
| 6,247,377 B1 | 6/2001 | Long et al. | |
| 6,782,773 B1 | 8/2004 | Jacquemont et al. | |
| 2010/0269615 A1* | 10/2010 | Endou et al. | 74/409 |

FOREIGN PATENT DOCUMENTS

| | | |
|---|---|---|
| JP | 59-85405 | 5/1984 |
| KR | 10-2004-0026350 | 3/2004 |
| NL | 6 707 093 | 11/1967 |

* cited by examiner

COMPLIANT GEAR ASSEMBLY, ENGINE AND GEAR TRAIN OPERATING METHOD

CROSS-REFERENCE TO RELATED APPLICATIONS

This patent application is a continuation-in-part of U.S. patent application Ser. No. 11/493,982, filed Jul. 27, 2006, now U.S. Pat. No. 7,658,124 the disclosure of which is incorporated herein by reference in its entirety.

TECHNICAL FIELD

The present disclosure relates generally to compliant gear assemblies, and relates more particularly to translating a gear ring relative to a hub in a compliant gear assembly responsive to a torque thereon from a first stop position to a second stop position responsive to a torque on the gear ring.

BACKGROUND

Excessive noise resulting from impacting and chattering, clattering gear teeth has been associated with gear systems for many years. In general terms, "gear rattle" refers to the noise phenomenon wherein gear teeth of adjacent gears come out of mesh and are rapidly forced back into mesh by a backside tooth impact, generating an audible noise. Not only can loud sounds from gear rattle make a work environment uncomfortable, the impacts between gear teeth and shocks through gear systems can result in premature wear and undue stress on components of the system. Moreover, where a given gear rattles against a meshing gear partner rather than smoothly transmitting torque, energy can be wasted in a manner familiar to those skilled in the gear-related arts.

In the context of an internal combustion engine, it is common to utilize a series of gears or a "gear train" to power certain engine components, and to provide for a desired relative timing between certain of the gears. In one example, a crank gear, rotated by the engine crankshaft, is rotatably linked with a cam gear, in turn coupled with one or more cams of the engine. One or more gears may be operably disposed between the crank and cam gears to maintain a relative timing between the two such that certain cam-actuated engine functions such as valve opening/closing and fuel injection will reliably take place at a desired time relative to engine crank angle.

On certain engines, dynamic activity of the crank and cam gears can be substantial, imparting significant torques through the gear train during operation. It is thus common for each of the crank and cam gears to experience impulsive accelerations and decelerations during engine operation. Cylinder firing applies a torque to the crankshaft and hence crank gear, whereas fuel injection tends to apply a torque to the camshaft and, hence, cam gear. In some engine systems, the rotational speed of the cam shaft may temporarily slow down hundreds of revolutions per minute from its average rotational speed due to force of mechanically actuated fuel injections. Torque impulses from the camshaft and crankshaft may affect the gear train independently from one another, or they may be additive or subtractive. Cylinder firing, fuel injection and other events tend to take place in relatively rapid succession, thus it will be readily apparent to those skilled in the art that the dynamic behavior of the gear train under such conditions may be quite complex. Energy transfer through a relatively stiff gear train with significant component inertias and backlash, or the separation of adjacent gear teeth, may be a series of very dynamic events with significant peak torque magnification, especially when large inertias from different gears collide with different velocities. In some instances, for example where a timing gear between the crank and cam gears, known in the art as an "idler gear," experiences torque impulses from either or both of the cam and crank gears, it may be induced to clatter intensely back and forth before settling back to relatively smooth operation. The front gear train may be the most significant noise producing part of an engine system.

The above problems have tended to be particularly acute in heavy duty compression ignition engines, as they tend to experience gear rattle problems over a greater range of operating conditions than lighter duty and/or spark ignited engines. Moreover, the desire to reduce certain gaseous emissions in compression ignition engines has been addressed with higher peak cylinder pressures and higher injection pressures, resulting in even greater impulsive loading in the engine gear train.

In addition to the obvious benefits of reducing wear and stress on the machine, and ameliorating the waste of energy, certain jurisdictions have paid increasing attention to gear train noise levels in working machinery. A host of reasons thus exist for addressing excessive noise production in gear systems. As stated above, problems associated with excessive gear noise have been recognized for many years. Engineers have thus sought to address such noise problems by a variety of means, one of which has been to increase the mass moment of inertia of the gear train and associated components to reduce its susceptibility to torque related disturbances. This has been achieved, for example, by increasing the mass of the gears themselves, and/or by incorporating pendulums to the cam and crank shafts. Adding mass to the engine and/or gear train components has obvious drawbacks, including increasing the overall weight, size and cost of the system. Another approach has been to introduce compliance into the gear train.

In general terms, compliant gears provide reduced stiffness, or slack, in the gear train, allowing one or more of the gears to attenuate its response to impulsive loads. Where a particular gear might otherwise be sharply accelerated or decelerated due to a torque impulse, compliance will allow the gear to more gradually adjust its rotation to accommodate the impulsive load. Compliant gears can thus allow adjacent gears to stay in mesh more of the time than non-compliant systems, reducing undue wear, mechanical strain and audible noise.

In one compliant gear design, "scissors gears" consisting of two closely adjacent coaxial gears having some rotational compliance are used to transmit torque or maintain timing between or among other gears. In a typical design, a front gear member of a scissors gear set meshes with a first gear, and a back gear member of the scissors gear set meshes with a second gear. Gear teeth of the respective front and back gear members of the scissors gears are movable relative to one another such that pairs of adjacent gear teeth behave in a manner considered similar to the operation of a pair of scissors, hence the name. While such a design, introducing rotational compliance between the front and back gears, may have certain benefits, the systems tend to be quite expensive and complex.

Another gear design using rotational compliance is known from U.S. Pat. No. 5,170,676 to Matouka et al. (hereafter "Matouka"). Matouka illustrates a torque limiter for use in a gear train which allows relative motion, i.e. rotational compliance, between a hub and gear ring when a certain torque value on the gear is exceeded. Matouka utilizes a spring whose spring force must be overcome before the gear ring and hub are able to rotationally slip from one relative position to another. While Matouka is applicable in some systems the design is not without drawbacks.

The present disclosure is directed to one or more of the problems or shortcomings set forth above.

SUMMARY OF THE DISCLOSURE

In one aspect, a compliant gear assembly includes a hub subassembly which includes a first hub component adapted for mounting the compliant gear assembly to a support element, the first hub component including a front face and a back face and defining a first axis which extends through the first hub component and is oriented normal to the front face. The hub subassembly further includes a second hub component which is movable relative to the first hub component in a direction perpendicular to the first axis between a first stop position and a second stop position. The compliant gear assembly further includes a gear ring mounted upon the hub subassembly and rotatable relative to the hub subassembly, the gear ring defining a gear ring axis of rotation and being coupled to move with the second hub component between the first stop position and the second stop position. At the first stop position the gear ring axis of rotation is co-linear with the first axis and at the second stop position the gear ring axis of rotation is parallel to but not co-linear with the first axis. The compliant gear assembly further includes a compliance mechanism coupled between the first hub component and the second hub component and biasing the second hub component toward the first stop position.

In another aspect, an internal combustion engine includes an engine housing and a gear train mounted to the engine housing and including a crank gear, a cam gear and an idler gear coupled between the crank gear and the cam gear and configured to transmit a torque between the crank gear and the cam gear. The idler gear includes a first hub component mounting the idler gear to the engine housing and including a front face and a back face and defining a first axis which extends through the first hub component and is oriented normal to the front face. The idler gear further includes a second hub component movable in a direction perpendicular to the first axis between a first stop position and a second stop position, and a gear ring defining a gear ring axis of rotation. The gear ring is coupled to move with the second hub component between the first stop position at which the gear ring axis of rotation is co-linear with the first axis and the second stop position at which the gear ring axis of rotation is parallel to but not co-linear with the first axis. The idler gear further includes a compliance mechanism coupled between the first hub component and the second hub component and biasing the second hub component toward the first stop position.

In still another aspect, a method of operating a gear train of an internal combustion engine includes a step of biasing a gear ring of an idler gear of the gear train toward a first stop position at which an axis of rotation of the gear ring, an axis of rotation of an input gear meshing with the gear ring and an axis of rotation of an output gear meshing with the idler gear define a first pattern. The method further includes the steps of transferring a first torque between the input gear and the output gear by way of the idler gear with the gear ring at the first stop position, and limiting transferring a second torque greater than the first torque between the input gear and the output gear at least in part by moving the gear ring responsive to application of the second torque thereon. Moving the gear ring includes moving the gear ring toward a second stop position at which the axis of rotation of the gear ring, the axis of rotation of the input gear and the axis of rotation of the output gear define a second pattern different from the first pattern. The method further includes a step of returning the gear ring to the first stop position.

BRIEF DESCRIPTION OF THE DRAWINGS

FIG. 3b is a back perspective view of the compliant gear assembly of FIG. 3a;

FIG. 6 is a sectioned view, taken along line 6-6 of FIG. 3a;

DETAILED DESCRIPTION

Figure 1:
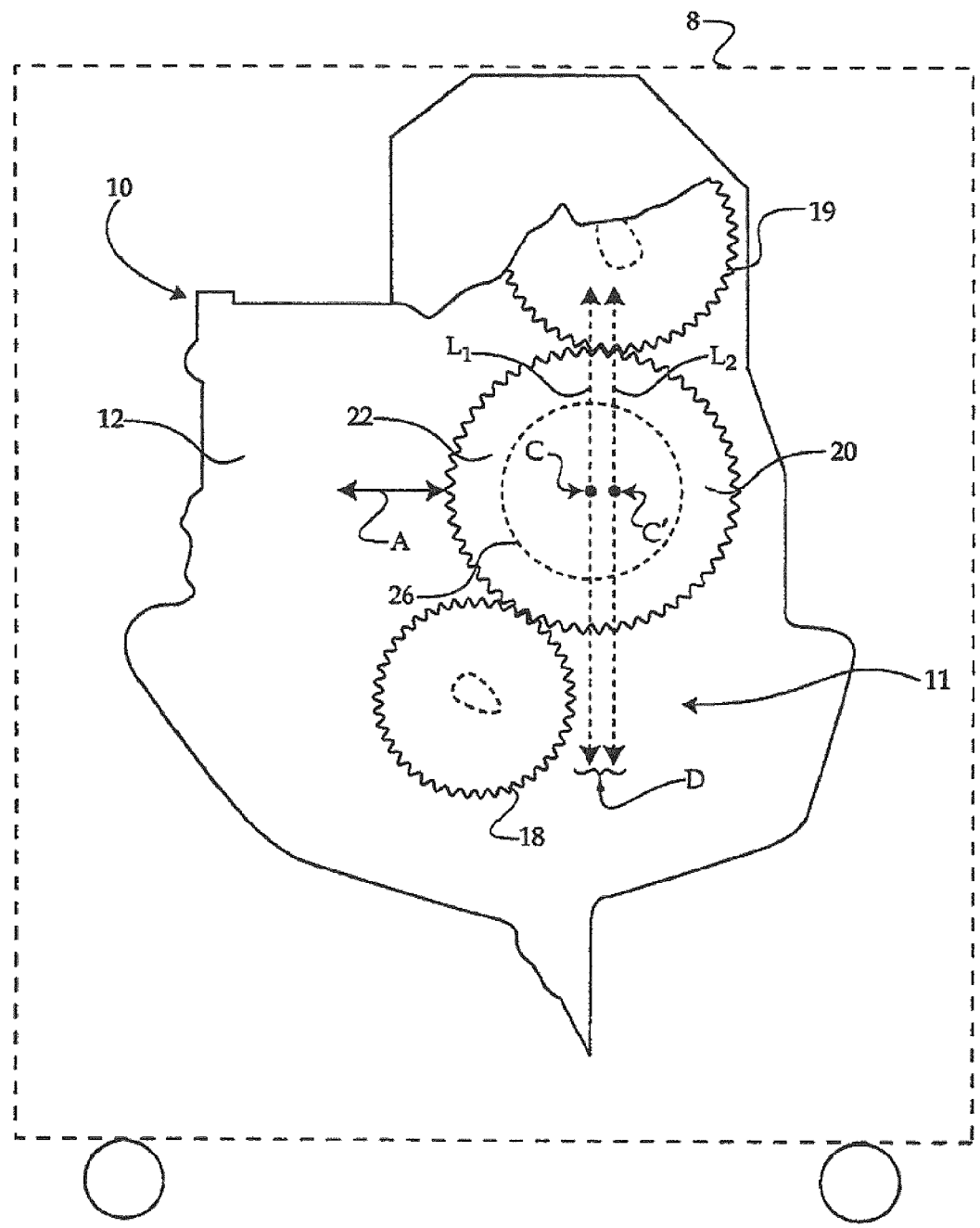
FIG. 1 is a schematic illustration of a machine with an engine system according to one embodiment.

Referring to FIG. 1, there is shown an engine system 10 in a machine 8, the engine system including an engine 12, for example an in-line compression ignition engine, and a gear train 11 mounted thereon. Gear train 11 may include a crank gear 18, a cam gear 19 and an idler gear assembly 20. Crank gear 18 will typically be coupled with a crankshaft (not shown), in turn coupled with piston rods and rotatable thereby in a conventional manner. Cam gear 19 may be rotatably coupled with crank gear 18 via idler gear assembly 20 to maintain a desired timing therebetween. Idler gear assembly 20 includes a hub 26 defining an axis C and a gear ring 22. Although engine system 10 is shown having a single idler gear assembly, in other embodiments multiple idler gears might be used depending upon the engine design. Hub 26 and gear ring 22 are biased toward coaxial alignment, such that an axis of gear ring 22 is coextensive with axis C. Gear ring 22 is translatable in a direction perpendicular to axis C responsive to a torque imparted thereto by at least one of crank gear 18 and cam gear 19.

Gear ring 22 may be translated across a distance D, its axis of rotation being movable in a direction perpendicular to axis C to the position denoted as axis C'. Because translation of gear ring 22 relative to hub 26 across distance D may affect the relative timing between cam gear 19 and crank gear 18, the available translation distance may be selected based at least in part on an allowable departure from the desired timing. In other words, because gear ring 22 assists in synchronizing cam gear 19 and crank gear 18, translation of gear ring 22 will temporarily allow cam gear 19 and crank gear 18 to be slightly out of synch. Where allowable timing differences between cam gear 18 and crank gear 19 are relatively large, translation distance D may be relatively large. In contrast, where operating constraints require that the timing differences be relatively small, translation distance D should be selected to also be relatively small. As stated above, hub 26 and gear ring 22 are biased toward coaxial alignment, so when the torque inducing the translation of gear ring 22 subsides, gear ring 22 and hub 26 will return toward coaxial alignment, making up any differences in relative timing. By translating gear ring 22, loads on idler gear assembly 20, and the other idler gear assembly embodiments described herein, may be managed to reduce noise, wear, etc., and the adjacent meshing gears may be maintained in mesh during operation. In FIG. 1, arrow A represents a general translation direction of gear ring 22, whereas lines $L_1$ and $L_2$ are used to illustrate the relative positions of the axis of gear ring 22 in its rest or biased position, and translated position, respectively.

Figure 2:
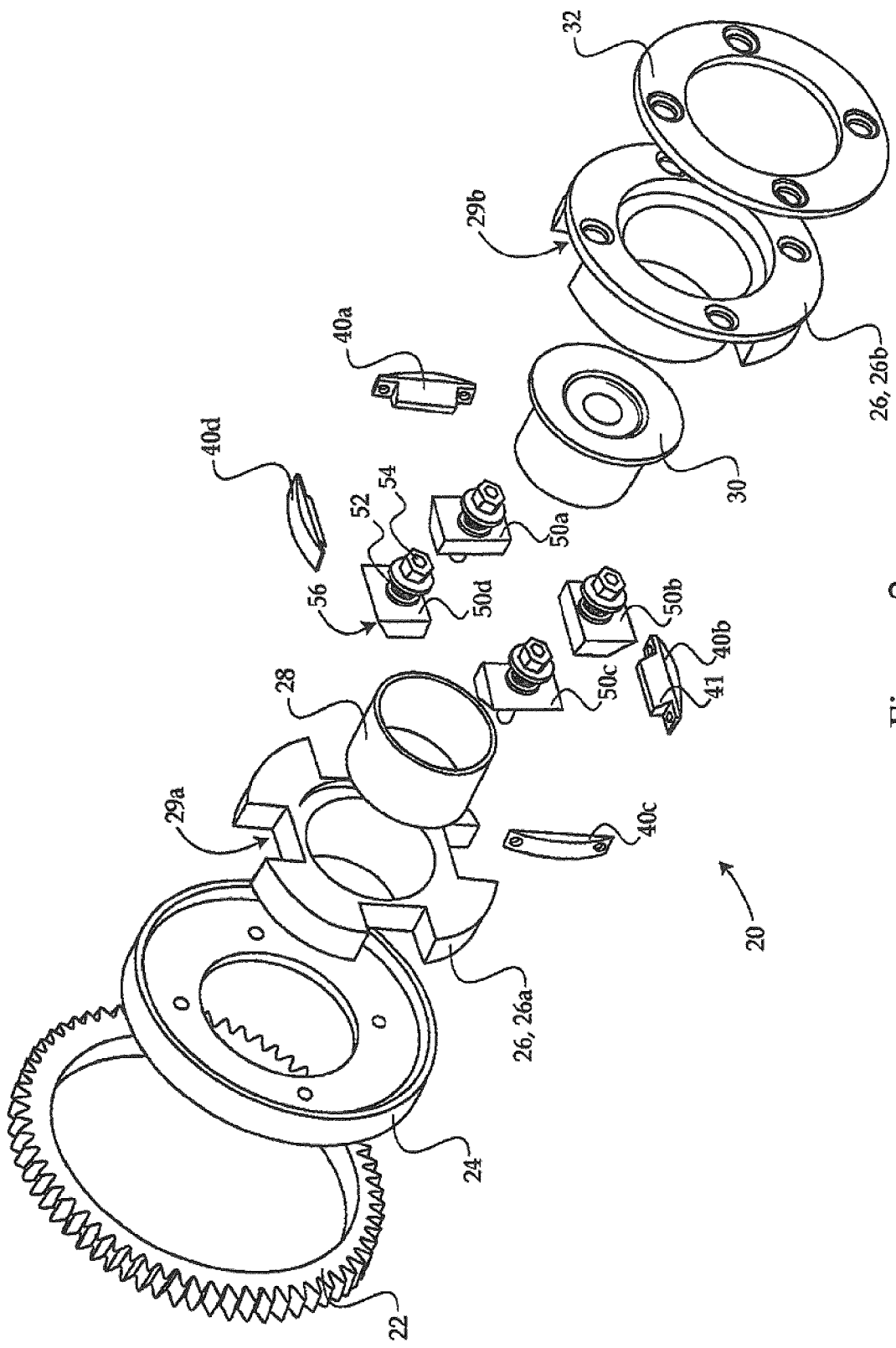
FIG. 2 is an exploded view of a compliant gear assembly according to one embodiment.
Figure 3B:
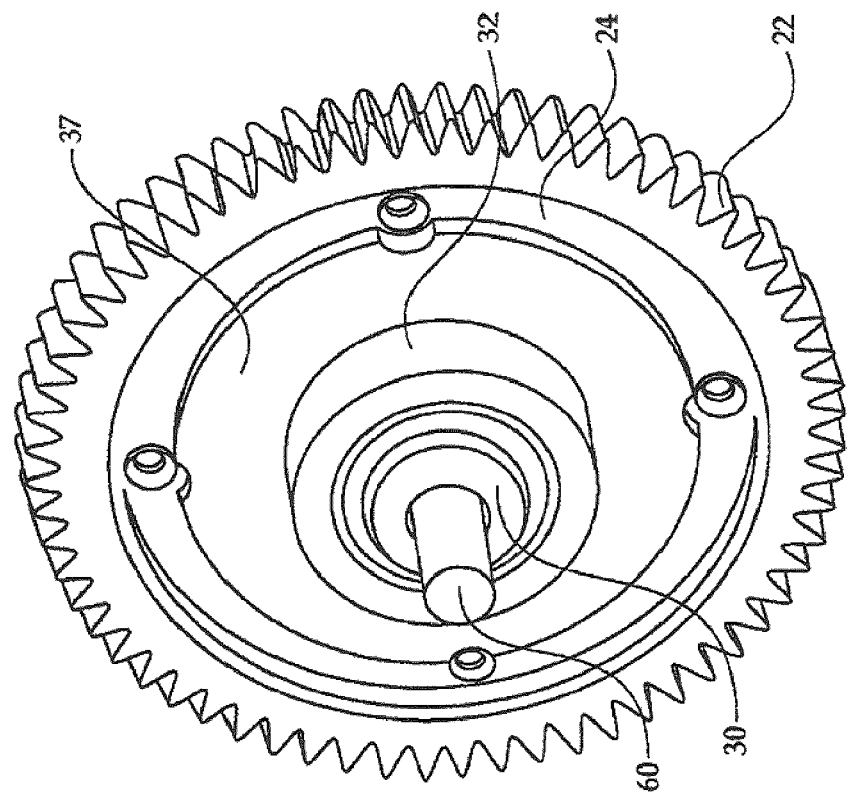
Figure 3A:
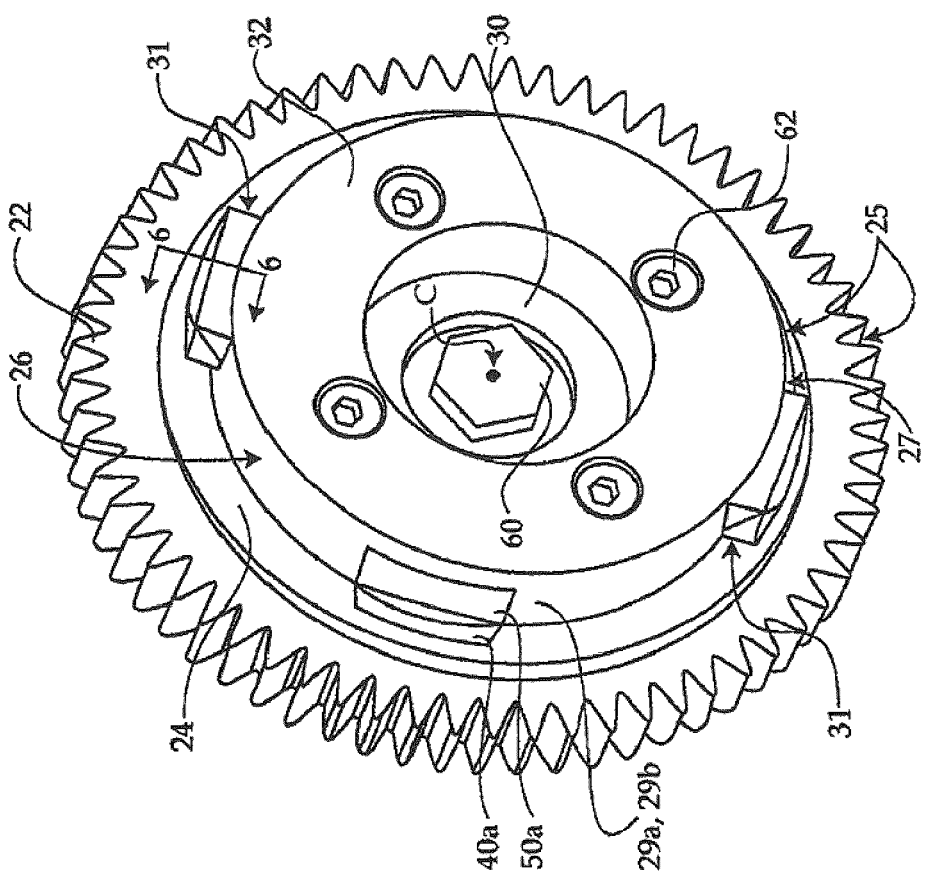
FIG. 3a is a front perspective view of a compliant gear assembly according to one embodiment.

Turning to FIGS. 2, 3a and 3b there are shown exploded and assembled front and back perspective views, respectively, of various components of one embodiment of an idler gear assembly 20 suitable for use in engine system 10 of FIG. 1. It should be appreciated that any of the idler gear assemblies described herein may be used with any of the described engine and gear train configurations, as well as other systems not specifically illustrated. Idler gear assembly 20 includes a gear ring subassembly 25 having an outer toothed gear ring 22 and an annular inner portion 24. Gear ring subassembly 25 is adapted to be mounted about a hub 26, comprising a hub subassembly 27 having first and second hub portions 26a and 26b. In gear assembly 20, gear ring subassembly 25 and hub subassembly 27 are fixed to rotate together and biased toward coaxial alignment with at least one actuator 31, for example, a plurality of actuators including springs 52 and blocks 50a-d. As described herein, gear ring 22 is configured to translate relative to hub 26, however, it should be understood that part or all of the components of gear ring subassembly 25 might be translatable relative to part or all of the components of hub subassembly 27. Thus, the descriptions herein of gear ring 22 translating relative to hub 26 should not be construed to mean that only gear ring 22 is moved relative to only hub 26, as other components may be involved. Idler gear assembly 20 may have other components capable of relative movement in a direction perpendicular to the axis defined by hub 26 responsive to a torque on gear assembly 20.

Hub subassembly 27 may be further mounted on a stubshaft 30 adapted to couple gear assembly 20 with engine 12 via a rotatable mounting shaft 60. A bushing 28 may further be positioned between stubshaft 30 and hub subassembly 27. The plurality of actuators may include a plurality of blocks 50a-d each coupled with a plurality of springs 52 and mounted upon a plurality of pins 54. When gear ring 22 is translated relative to hub 26, it will move against a biasing force of springs 52. Hence, when the torque on gear assembly 20 which induces the translation of gear ring 22 subsides, biasing springs 52 may urge gear ring 22 and hub 26 back toward coaxial alignment. Although in the illustrated embodiment of gear assembly 20, actuators 31 having springs 52 and blocks 50a-d, are shown, it should be understood that the present disclosure is not thereby limited, and only one actuator capable of biasing hub 26 and gear ring 22 toward coaxial alignment might be used. The term "actuator" as described herein should be understood to encompass a wide variety of devices, including spring, hydraulic, pneumatic, or combinations of spring, hydraulic and pneumatic actuators.

Each of the plurality of actuators 31 may be positionable within cutouts 29a and 29b of hub portions 26a and 26b, respectively. Ring subassembly 25 may in turn include at least one contact surface 41, for example, a plurality of contact surfaces disposed on a plurality of pads 40a-d aligned one with each of blocks 50a-d and radially spaced about ring subassembly 25. Translation loads on gear assembly 20 will typically be reacted via a bearing of pads 40a-d against blocks 50a-d. Because the entire assembly will typically rotate on mounting shaft 60, the particular blocks and pads which react a given translation load will vary, depending upon the relative angular position of gear assembly 20 when the translation inducing torque is encountered. A cover or ring plate 32 may also be provided and, in conjunction with a plurality of bolts 62 separate from pins 54, may couple together all of the assembled components of gear assembly 20 in the desired configuration. It should be appreciated that each of springs 52 may require a relatively high pre-load, on the order of 800 pounds per spring in some embodiments, and, hence, relatively robust means for coupling all of the components together may be desirable. Further, orienting springs 52 to compress and expand in a direction aligned with the axis of rotation of gear assembly 20 facilitates assembly as the springs may be compressed and the entire assembly secured with bolts 62 in a relatively small number of assembly steps.

Figure 6:
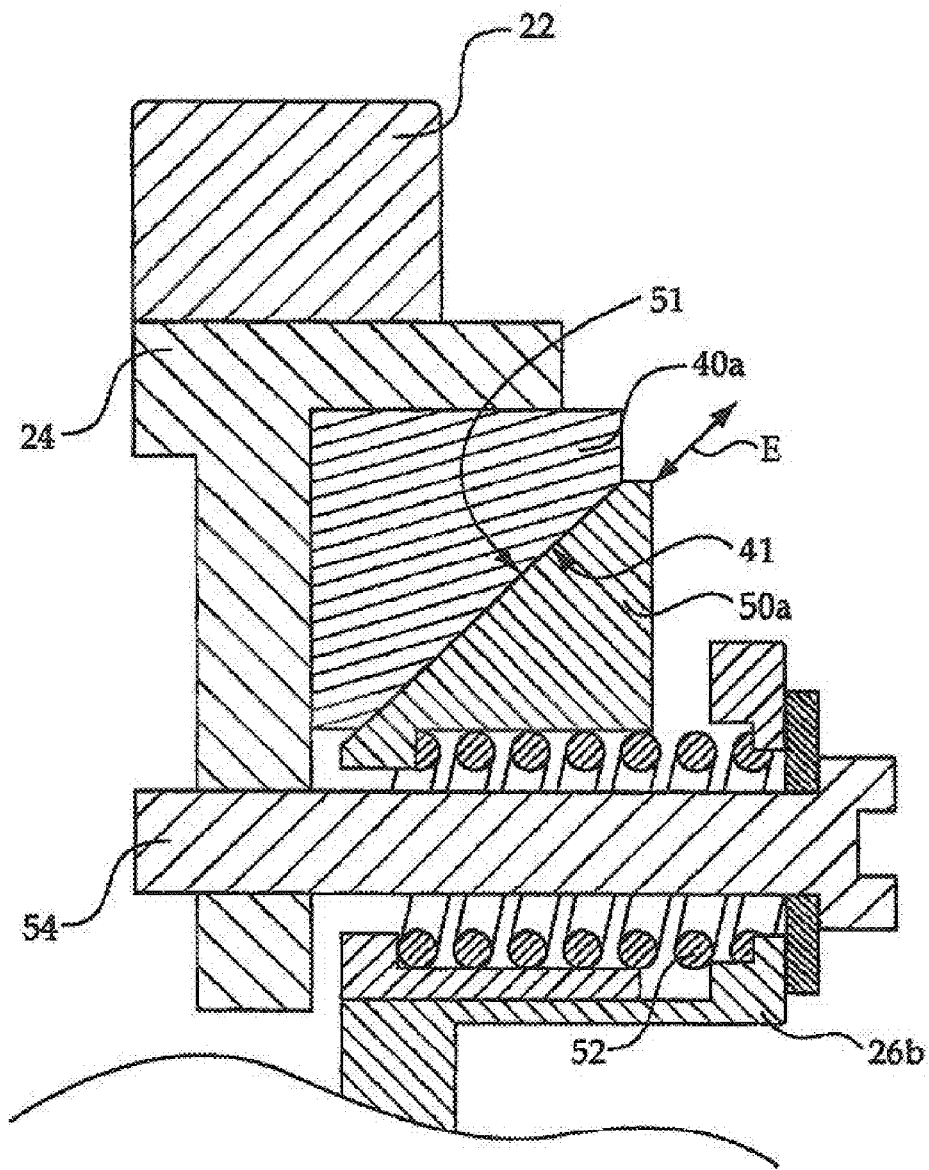

Turning to FIG. 6, there is shown a sectioned side view taken along line 6-6 of FIG. 3. FIG. 6 illustrates gear ring 22, gear ring inner annular portion 24, a pad 40a, a block 50a, spring 52 and a pin 54. Block 50a is shown with pin 54 extending therethrough, however, in other embodiments block 50a will be configured without a corresponding pin. In such an embodiment, blocks 50a may be movable within and guided by cutouts 29a and 29b alone, or other components. Translation of gear ring 22 relative to hub portion 26b will typically include overcoming a static coefficient of friction between block 50a and pad 40a. A block surface 51 of block 50a may be positioned to slidably abut a contact surface 41 of pad 40a. A lubricant may be disposed between the respective surfaces 41 and 51. In the illustrated configuration, surfaces 51 and 41 are oriented diagonally relative to an axis of rotation of gear assembly 20. It should be appreciated that the relative orientation of the diagonal surfaces might differ from that illustrated, or even be reversed, without departing from the intended spirit and scope of the present disclosure. In addition to overcoming a static coefficient of friction between surfaces 41 and 51, in order to translate gear ring 22, and its associated subassembly 25, relative to hub subassembly 27 it may be necessary to overcome, a pre-load of springs 52. Thus, where it is desired to provide a relatively stiffer gear train, springs 52 might be relatively more highly preloaded, whereas for a relatively less stiff gear train, having greater compliance, springs 52 might be preloaded relatively less. An approximate direction of sliding movement between block 50a and pad 40a during translation of gear ring 22 is shown in FIG. 6 via arrow E. Those skilled in the art will appreciate that a wide variety of factors may contribute to the preload which is overcome when block 50a translates relative to pad 40a. Relative friction between the slidable surfaces, ramp inclination, spring preloading, etc. may all be varied to a preload level to be matched or exceeded by torque on the gear prior to translation. In some embodiments, spring preload will be determined solely by dimensions and tolerances of the various components.

Figure 4:
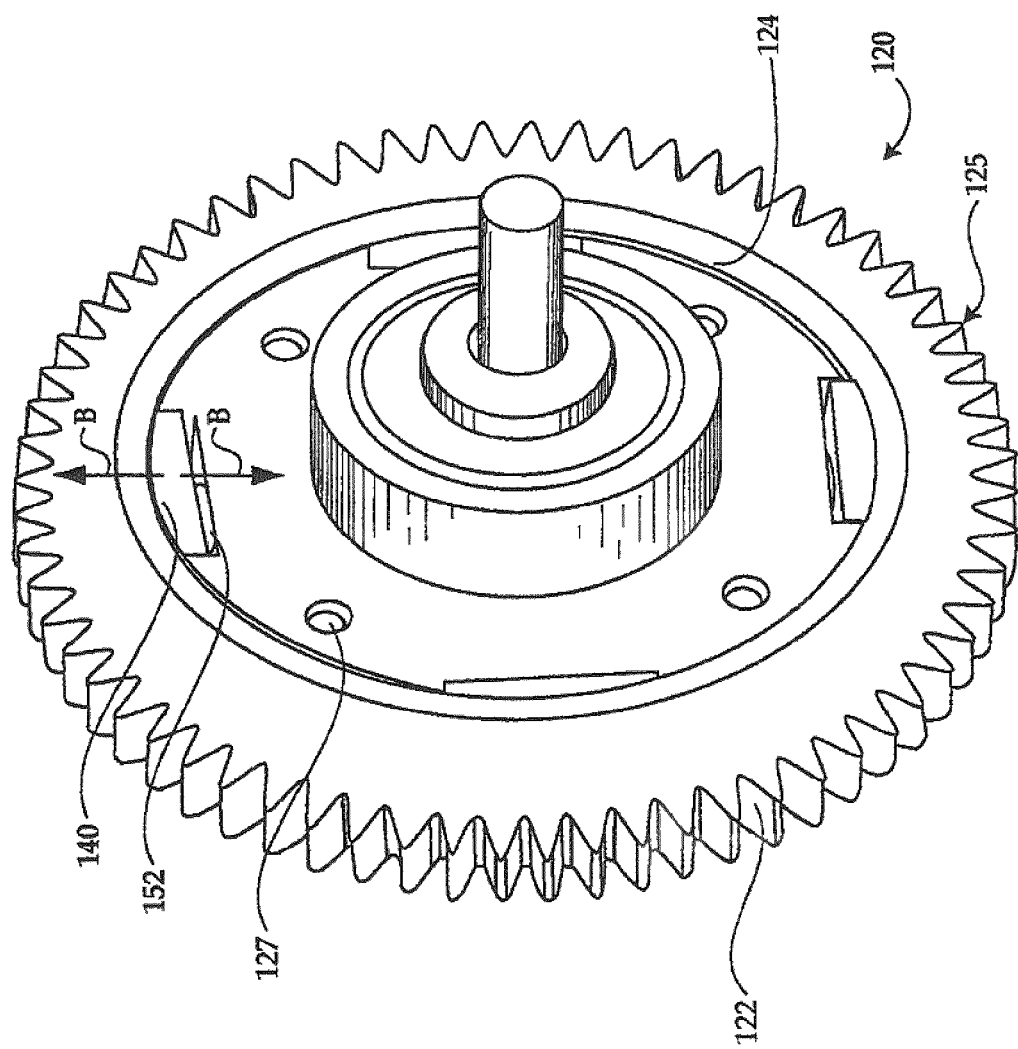
FIG. 4 is a perspective view of another embodiment of a compliant gear assembly.

Turning to FIG. 4, there is shown a gear assembly 120 according to another embodiment of the present disclosure. Gear assembly 120 has similarities to gear assembly 20, including a hub subassembly 127, and a gear ring subassembly 125 having a gear ring 122 and a gear ring inner annular portion 124. Similar to gear assembly 20, gear ring subassembly 125 is configured to translate relative to hub subassembly 125 responsive to a torque on gear assembly 120. A plurality of actuators each including a block 140 and spring 152 may be disposed between hub subassembly 127 and gear ring subassembly 125. In contrast to gear assembly 20, blocks 140 do not slide relative to any portion of gear ring subassembly 125, rather, springs 152 move in a direction denoted by arrow B that is approximately perpendicular to an axis of rotation of gear assembly 120.

Figure 5:
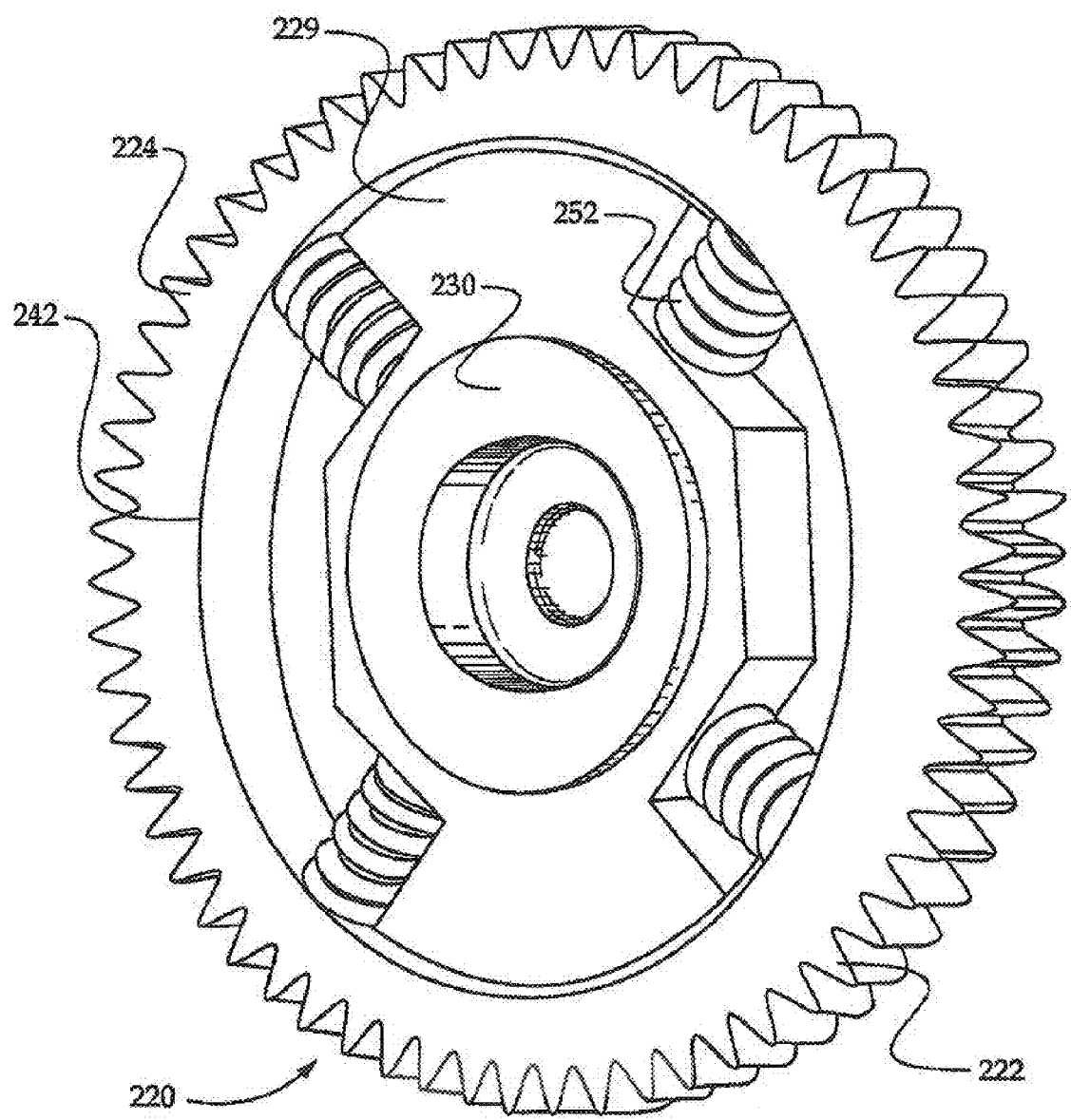
FIG. 5 is a perspective view of yet another embodiment of a compliant gear assembly.

Referring now to FIG. 5, there is shown yet another embodiment of a gear assembly 220 according to the present disclosure. Gear assembly 220 is similar to the foregoing embodiments, in that an outer gear ring 224 is translatable relative to a hub 229 responsive to a torque on gear assembly 220. However, rather than blocks, the embodiment of FIG. 5 uses springs 252 which are oriented radially outwardly about hub subassembly 229 and abut a contact surface 242 of gear ring 224.

Figure 7:
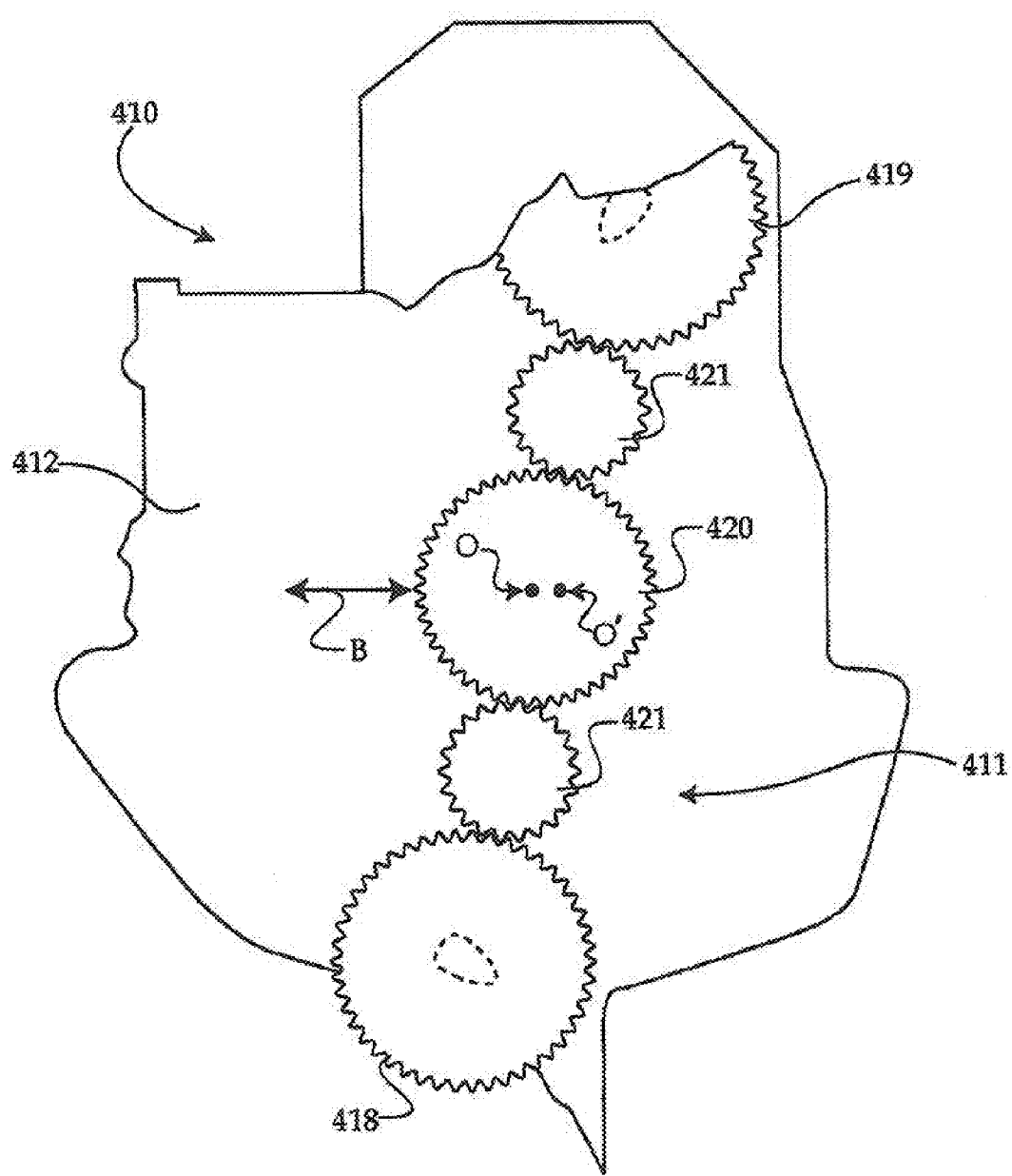
FIG. 7 is a schematic illustration of an engine system according to one embodiment.

Referring to FIG. 7, there is shown an engine system 410 differing from engine system 10 in that a gear train of the engine 411 is relatively closer to an in-line configuration, and includes additional intermediate gears 421. Similar to engine system 10 of FIG. 1, gear train 411 includes a cam gear 419 and a crank gear 418, and an idler gear assembly 420 having a gear ring (not shown in FIG. 7) which is translatable responsive to a torque on the gear assembly such that the axis of rotation of the gear ring will also translate in directions shown with arrow B. Also illustrated are the two relative positions of the axis of rotation of the gear ring, O and O', similar to the different axial positions for the gear ring of gear assembly 20 shown in FIG. 1. Idler gear assembly 420 also differs from the foregoing embodiments, among other things, in that rather than a gear ring fixed to rotate with a hub, the gear ring is rotatable about the hub, which is in turn fixed to engine 412.

Figure 8:
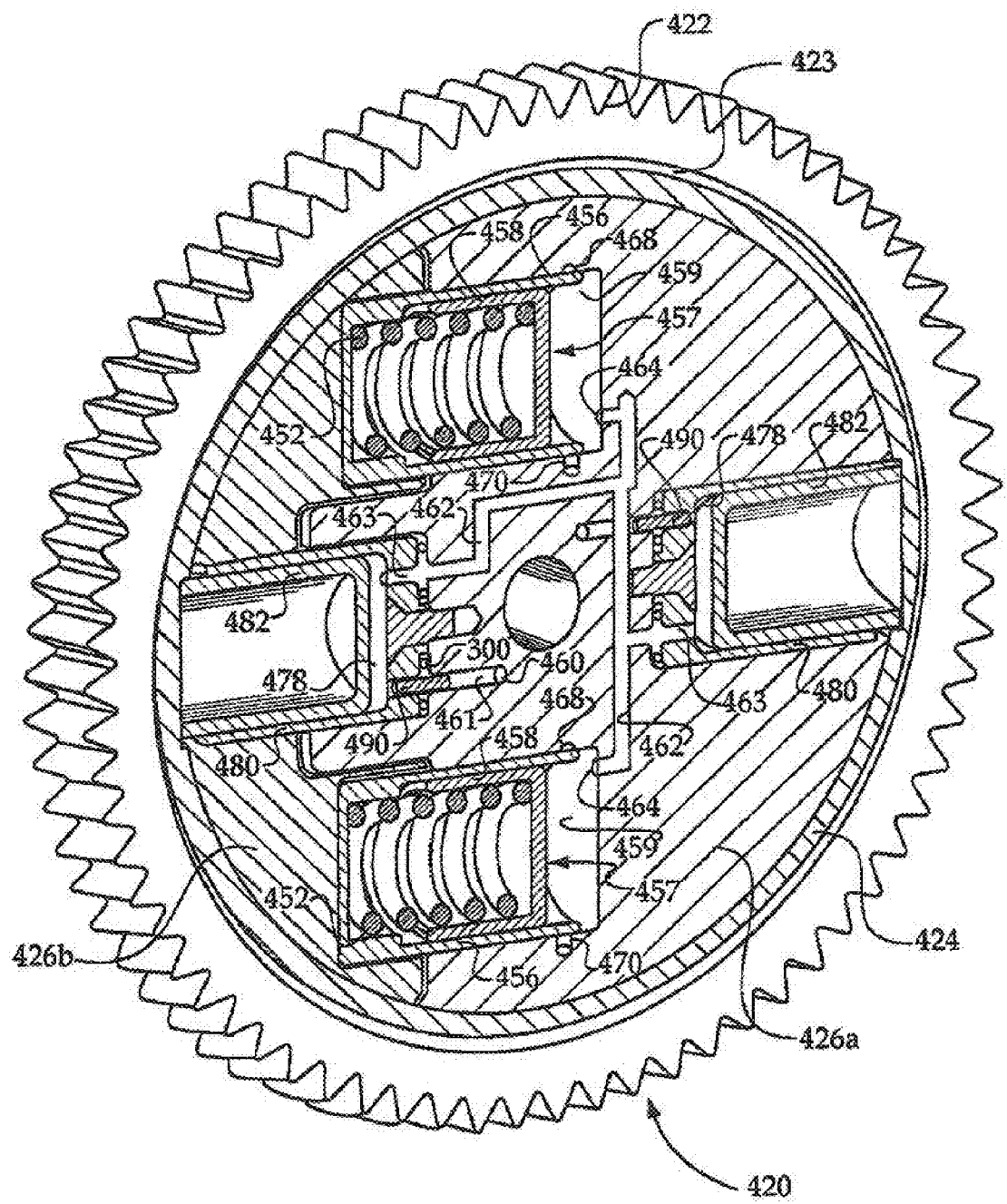
FIG. 8 is a sectioned side view, in perspective, of a gear assembly according to one embodiment.

Turning now to FIG. 8, there is shown a sectioned side perspective view of idler gear assembly 420. Idler gear assembly 420 includes a gear ring 422, mounted on a ring bearing 423 about a mounting ring 424. A first hub portion 426a is also provided, and will typically be configured to fixedly mount to engine 412. A second hub portion 426b may be fixed to mounting ring 424 and configured to move relative to first hub portion 426a. First and second hub portions 426a and 426b may be configured to mate, and movable between an abutting position and a separated position at which gear ring 422 is coaxially aligned with first hub portion 426a, as described herein. When gear assembly 420 experiences a torque impulse, second hub portion 426b, gear ring 422, ring bearing 423 and mounting ring 424 may all move as a unit relative to first hub portion 426a. In other embodiments, the functions of the respective hub portions might be reversed. Further still, gear assembly 420 might include a different number of hub portions than two.

Gear assembly 420 is further provided with at least one actuator configured to bias gear ring 422 toward coaxial alignment with first hub portion 426a. The at least one actuator may comprise two hydraulically actuated compensation pistons 458. Compensation pistons 458 may be positioned at least partially within first hub portion 426a, and may further each include a pressure surface 457 exposed to a fluid pressure of first and second fluid cavities 459 defined by first hub portion 426a. Compensation pistons 458 may further be movable each within a sleeve 456 that is fixed to second hub portion 426b, for example, pressed therein. A spring 452 may be disposed internally, or via another configuration, between each of pressure compensation pistons 458 and sleeves 456. For reasons that will be apparent from the following description, springs 452 may have a relatively soft spring rate or spring constant and, in cooperation with hydraulic pressure of cavities 459, will allow gear ring 422 to translate responsive to torques on gear assembly 420, but may dynamically isolate gear assembly 420 from certain impulsive frequencies of gear train 411 which are considered most problematic during operation of engine 412.

Hydraulic fluid may be supplied to gear assembly 420 from a hydraulic system of engine system 410, for example, directly from the block of engine 412. To this end, first hub portion 426a may include at least one, for example two, fluid inlets 460 connecting each with a fluid supply passage 461 within hub portion 426a. Passages 461 may in turn connect via inlet check valves 490, for example reed valves, with fluid pressurization chambers 478. Chambers 478 may be defined, for example, by a second set of sleeves 480 fixed, for example pressed, to hub portion 426a. At least one, for example two, fluid pressurization pistons 482 may be movably disposed within sleeves 480 and coupled to move with mounting ring 424. Thus, translation of mounting ring 424 with gear ring 422 will induce pistons 482 to move back and forth within their respective sleeves as gear ring 422 and its associated components translate, as described herein. Movement of pistons 482 will alternately draw fluid into chambers 478 via valves 490, and push fluid out via a fluid outlet 463 connecting to each of chambers 478. Fluid outlets 463 may connect via a fluid pressure passage 462 with each of cavities 459, allowing fluid pressurized by pistons 482 to be supplied thereto. Check valves such as reed valves may also be associated with outlets 463. Each of cavities 459 further includes a fluid outlet 468, for example an annulus in first hub portion 426a, which connects to a fluid drain 470. Outlets 468 may be alternately opened and closed by sleeves 456 based on the fluid pressure in cavities 459, as described herein, and loads on gear assembly 420.

Figure 9:
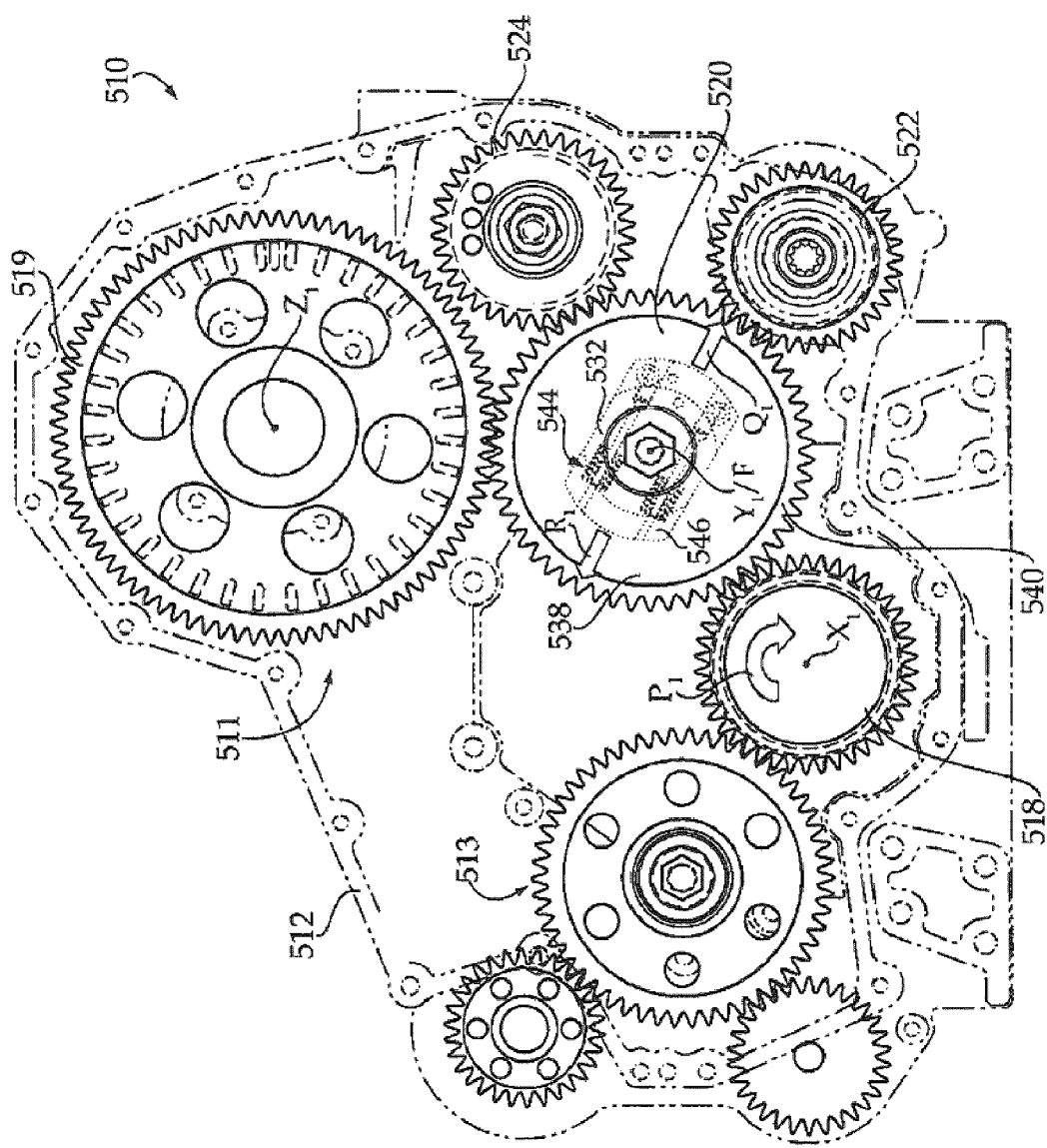
FIG. 9 is a schematic illustration of an engine system according to one embodiment.

Referring to FIG. 9, there is shown an internal combustion engine 510 according to another embodiment. Internal combustion 510 may include an engine housing 512 and a gear train 511 mounted to engine housing 512. Gear train 511 has similarities with other embodiments described herein, but certain differences, as will be further apparent from the following description. Gear train 511 may include a crank gear 518 defining a crank gear axis of rotation $X_1$, and having a rotation direction indicated by way of arrow $P_1$. A set of component drive gears 513 may be coupled with and rotatable by way of the rotation of crank gear 518. An idler gear 520, which may include a compliant gear assembly as further described herein, may be coupled with and in mesh with crank gear 518. A pump gear 522 may be in mesh with and driven via a rotation of idler gear 520, and an air compressor gear 524 may also be in mesh with and driven by idler gear 520. A cam gear 519 may also be in mesh with idler gear 520. Cam gear 519 may define a cam gear axis of rotation $Z_1$. Idler gear 520 may include a gear ring 540 which is mounted upon and rotatable about a hub subassembly 530. Gear ring 540 may define a gear ring axis of rotation $Y_1$ and is movable responsive to application of a torque on gear ring 540 to provide compliance in gear train 511, as further described herein. Arrow $Q_1$ denotes an approximate direction of translation of gear ring 540 and, hence, a direction of movement of gear ring axis of rotation $Y_1$.

In one embodiment, gear ring 540 may be movable responsive to application of a torque thereon between a first stop position at which gear ring axis of rotation $Y_1$, crank gear axis of rotation $X_1$ and cam gear axis of rotation $Z_1$ define a first pattern and a second stop position at which gear ring axis of rotation $Y_1$ crank gear axis of rotation $X_1$ and cam gear axis of rotation $Z_1$ define a second pattern which is different from the first pattern. In other words, when gear ring 540 is translated responsive to application of a torque thereon, gear ring axis of rotation $Y_1$ may move in the direction indicated via arrow $Q_1$ as gear ring 540 moves from the first stop position toward the second stop position. Gear ring 540 may be biased toward the first stop position and movable against a biasing force toward the second stop position. In the embodiment shown, a direction of the biasing force is illustrated via arrow $R_1$. During operation, rotation of crank gear 518 may transfer a torque to idler gear 520 which in turn transfers a torque to cam gear 519. Under certain circumstances, similar to those described herein in connection with other embodiments, relatively higher torques or torque spikes may be applied to idler gear 520 from at least one of crank gear 518 and cam gear 519. Where a torque spike is applied to idler gear 540 having a magnitude sufficient to overcome the biasing force mentioned above gear ring 540 may be translated against the biasing force to limit transferring the torque spike between crank gear 518 and cam gear 519.

Operating gear train 511 may thus include transferring a first, relatively lower torque between crank gear 518 and cam gear 519 by way of idler gear 520 with gear ring 540 at the first stop position. Operating gear train 511 may further include limiting transferring a second, relatively greater torque at least in part by moving gear ring 540 toward the second stop position responsive to application of the second torque on gear ring 540. In the illustrated engine embodiment, crank gear 518 serves as an input gear and cam gear 519 serves as an output gear. It should be appreciated that in other embodiments, idler gear 520 might be employed in a gear train which is not used on an internal combustion engine, and thus a different type of input gear and a different type of output gear might be used.

Biasing gear ring 540 toward the first stop position may include biasing gear ring 540 by way of a uni-directional compliance mechanism 542 defining a biasing force direction oriented normal to gear ring axis of rotation $Y_1$. As used herein, the term "uni-directional" compliance mechanism should be understood to refer to a compliance mechanism which allows for movement of gear ring 540 from a biased position, e.g. the first stop position, in one direction, but does not allow for movement of gear ring 540 in an opposite direction from the biased position. The biasing force direction is illustrated by way of arrow $R_1$. Accordingly, limiting transferring a second torque or a torque spike may include limiting transferring a second torque or a torque spike by moving gear ring 540 in a direction opposed to the biasing force direction. When the torque spike subsides, gear ring 540 may be returned to the first stop position by the biasing force of compliance mechanism 542.

Uni-directional compliance may be appropriate in a gear train such as gear train 511 due to the chosen geartrain configuration. Cylinder firing will tend to accelerate crank gear 518, hence a torque spike from cylinder firing will tend to accelerate idler gear 520 in a counterclockwise direction opposite the clockwise direction of rotation of crank gear 518. Fuel injections will tend to decelerate cam gear 519, hence a torque spike from fuel injection will tend to decelerate idler gear 520. A torque spike from crank gear 518 which tends to accelerate idler gear 520 will tend to urge idler gear 520 rightward in FIG. 9 in a direction opposed to the biasing force of compliance mechanism 542. Similarly, a torque spike from cam gear 519 will also tend to urge idler gear 520 rightward in FIG. 9. If torque spikes from crank gear 519 and cam gear 519 overlap, idler gear 520 may still tend to be urged rightward. Since a majority, or all, of the torque spikes idler gear 520 is likely to experience in gear train 511 will tend to urge idler gear 520 in the same direction, uni-directional compliance provides a practical implementation strategy.

Compliance mechanism 542 may be coupled between a first hub component 532 of hub subassembly 530 which is adapted to mount idler gear 540 to housing 512 and a second hub component 538 of hub subassembly 530. Second hub component 538 may be movable with gear ring 540 between the first stop position and the second stop position. Accordingly, gear ring 540 as well as second hub component 538 may each be understood to have a first stop position and a second stop position. Likewise, gear ring axis of rotation $Y_1$ may be understood to have a first stop position and a second stop position.

In the embodiment shown, compliance mechanism 542 includes a spring component 544 and a pad component 546 which are coupled between first hub component 532 and second hub component 538. Operating gear train 511 may be further understood to include stopping gear ring 540 at the second stop position by contacting pad component 546 with first hub component 532, and stopping gear ring 540 at the first stop position by contacting second hub component 538 with first hub component 532. An example construction of compliance mechanism 542 is further described hereinbelow.

Figure 11:
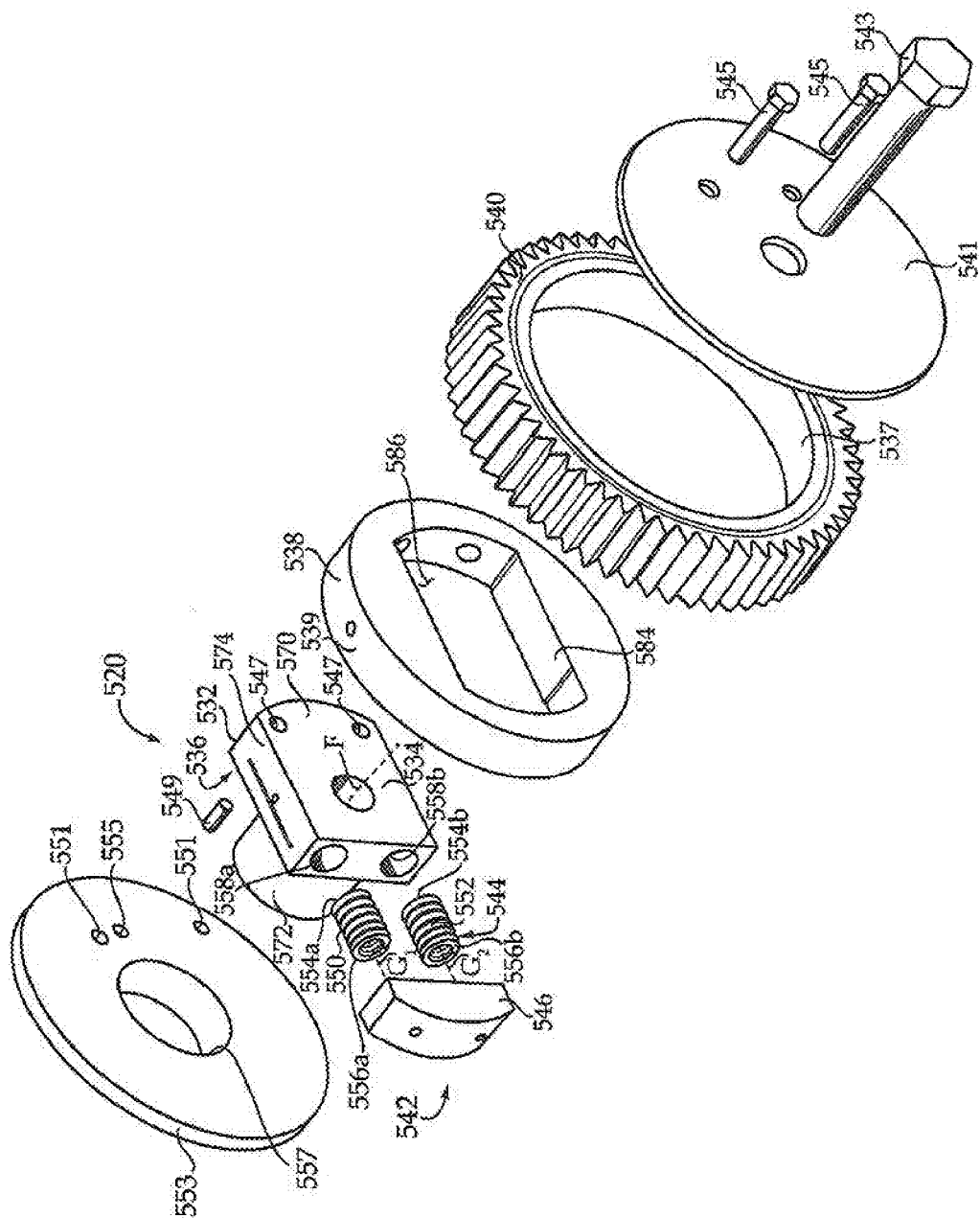
FIG. 11 is an exploded view of a gear assembly according to one embodiment.
Figure 12:
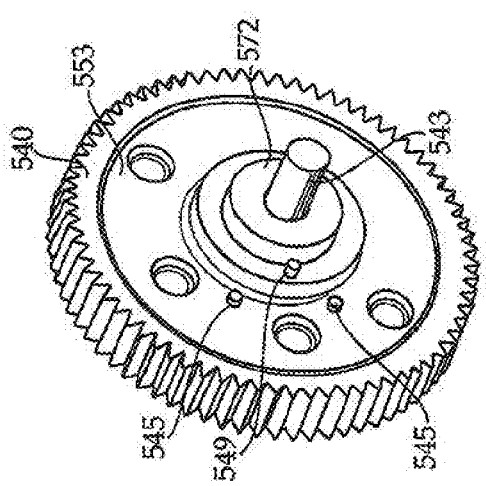
FIG. 12 is a back view of the gear assembly of FIG. 11, in an assembled state.
Figure 13:
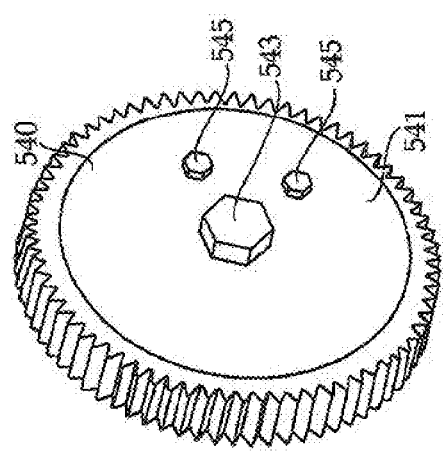
FIG. 13 is a front view of the gear assembly of FIG. 12.

Referring now to FIG. 11, there is shown an exploded view of idler gear 520. As mentioned above, gear ring 540 may be rotatable about hub subassembly 530. Gear ring 540 may include an inner surface 537 which rotates upon an outer surface 539 of second hub component 538. Second hub component 538 may include an inner surface 584 which defines a void 586 wherein a portion of first hub component 532 and compliance mechanism 542 are positioned. A cover plate 541 may be provided which is positioned at a first axial side of gear ring 540 and hub subassembly 530, and a backing plate 553 which is positioned at a second axial side of gear ring 540 and hub subassembly 530. In one embodiment, a set of locating bolts 545 may be provided which are passed through cover plate 541, passed through a set of apertures 547 formed in first hub component 532 and also passed through a set of apertures 551 formed in backing plate 553. A peg 549 may also be provided which is fitted into an aperture (not shown) formed in first hub component 532 and also fitted into an aperture 555 formed in backing plate 553. A center bolt 543 may also be passed through cover plate 541 and the other components of idler gear 520 to couple the various components together in an assembled state. Referring also to FIGS. 12 and 13, there are shown a back view and front view, respectively, of idler gear 520. In FIG. 12, ends of locating bolts 545 are shown extending through backing plate 553, as well as peg 549 and center bolt 543. In one embodiment, peg 549 may project from backing plate 553 as shown in FIG. 12, and be received in a bore formed in engine housing 512. A mounting bore receiving center bolt 543 may also be formed in engine housing 512 so that idler gear 520 mounts directly thereto and hub subassembly 530 fixed against rotation. In FIG. 13, locating bolts 545 and center bolt 543 are shown in an assembled configuration passed through cover plate 541.

First hub component 532 may include a front face 534 and a back face 536, and may define a first axis F which extends through first hub component 532 and is oriented normal to front face 534, and may also be oriented normal to back face

Figure 14:
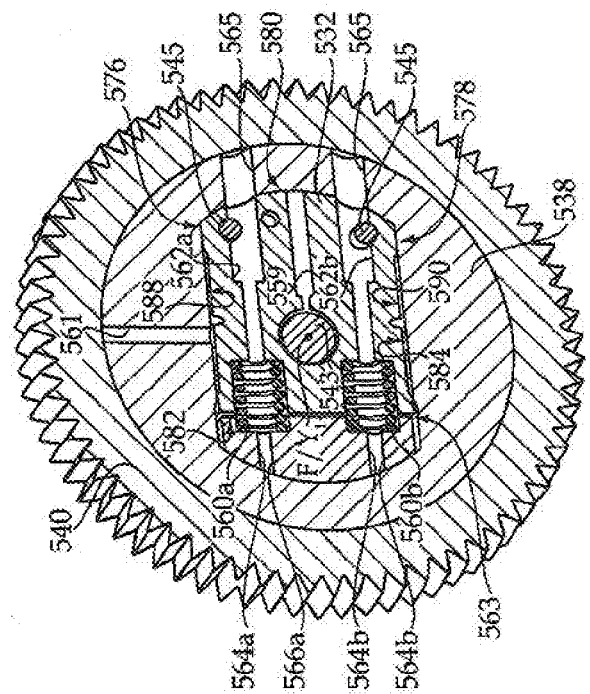
FIG. 14 is a sectioned view of the gear assembly of FIGS. 11-13.

536. First hub component 532 may also include a block element 570 positionable in void 586 which includes front face 534 and back face 536, and a mounting projection 572 which extends outwardly from back face 536 in a direction generally aligned with first axis F. Mounting projection 572 may be cylindrical and may be received in a cylindrical aperture 557 formed in backing plate 553. Referring also to FIG. 14, there is shown a sectioned view through idler gear 520. It will be recalled that gear ring 540 is movable between a first stop position and a second stop position. In one embodiment, gear ring 540 may be coupled to move with second hub component 538 between the first stop position at which gear ring axis of rotation $Y_1$ is co-linear with first axis F and the second stop position at which gear ring axis of rotation $Y_1$ is parallel to but not co-linear with first axis F. Movement of second hub component 538 relative to first hub component 532 between the first stop position and the second stop position may take place in a direction of translation which is perpendicular to first axis F. As discussed above, compliance mechanism 542 may bias gear ring 540 toward the first stop position at which gear ring axis of rotation $Y_1$ and first axis F are co-linear.

As mentioned above, compliance mechanism 542 may include a spring component 544 and a pad component 546 which is separate from spring component 544. Pad component 546 may transmit a biasing force of spring component 544 to second hub component 538 in a biasing force direction normal to first axis F. In one embodiment, spring component 544 may include a first helical spring 550 defining a first longitudinal spring axis $G_1$, and a second helical spring 552 defining a second longitudinal spring axis $G_2$. Longitudinal spring axis $G_1$ and longitudinal spring axis $G_2$ may be oriented parallel to one another but not co-linear. In other embodiments, non-parallel helical springs, a single helical spring or some other spring or biaser configuration might be used. Each of first helical spring 550 and second helical spring 552 may include an inboard spring end 554*a* and 554*b*, respectively. Each helical spring 550 and 552 may also include an outboard spring end 556*a* and 556*b*, respectively. First hub component 532 may define a first spring bore 558*a* receiving inboard spring end 554*a* of first helical spring 550. First hub component 532 may further define a second spring bore 558*b* receiving inboard spring end 554*b* of second helical spring 552. Pad component 546 may define a third spring bore 560*a* receiving outboard end 556*a* of first helical spring 550 and a fourth spring bore 560*b* receiving outboard end 556*b* of second helical spring 552. First spring bore 558*a* may be coaxial with third spring bore 560*a*, and second spring bore 558*b* may be coaxial with fourth spring bore 560*b*.

FIGS. 11 and 14 also illustrate certain features of idler gear 520 whereby movement of second hub component 538 between the first stop position and the second stop position is guided relative to first hub component 532. First hub component 532 may further include an outer peripheral surface 574 extending between front face 534 and back face 536. Outer peripheral surface 574 may include a first outer guide surface 576, a second outer guide surface 578, a first outboard end surface 580 and a second outboard end surface 582. Inner surface 584 of second hub component 538 may include a first inner guide surface 588 abutting first outer guide surface 576, and a second inner guide surface 590 abutting second outer guide surface 578. As second hub component 538 moves with gear ring 540 relative to first hub component 532, interaction between guide surfaces 588 and 576, and interaction between guide surfaces 590 and 578, can guide movement of second hub component 538 relative to first hub component 532. The interface between guide surfaces 588 and 576, and between guide surfaces 590 and 578 may be a lubricated interface. To this end, first hub component 559 may define an oil passage communicating, for example, with an oil system of engine 510, which supplies lubricating oil to internal components of hub subassembly 530. During operation, oil may be passed from oil supply passage 559 to and among various components of idler gear 520. Providing an oil film via oil supplied by passage 559 between pad component 546 and first hub component 532, and also between first hub component 532 and second hub component 538, can provide some protection against hard stops at the first stop position and second stop position. A second oil passage 561 is defined by second hub component 538 and can supply oil to a rotating interface between inner surface 537 of gear ring 540 and outer surface 539 of second hub component 538.

In FIG. 14, idler gear 520 is shown approximately as it would appear with second hub component 538 and gear ring 540 at the first stop position where gear ring axis of rotation $Y_1$ and first axis F are co-linear. When a torque is applied to gear ring 540 which is sufficient to overcome the biasing force of compliance mechanism 544, gear ring 540, hub component 538 and pad component 546 may translate to the right in the FIG. 14 illustration against a biasing force of spring component 544. As explained above, translating second hub component 538, gear ring 540 and pad component 546 responsive to a torque on gear ring 540 can move gear ring axis of rotation $Y_1$ in a direction which is normal to first axis F and toward the second stop position. At the first stop position, which may be a first mechanical stop position, travel of second hub component 538 relative to first hub component 532 in a first direction, leftward in FIG. 14, is limited by way of contact between first outer end surface 580 and inner surface 584 of second hub component 538. First outer end surface 580 and inner surface 584 are shown abutting one another in FIG. 14. At the first stop position, a gap 563 exists between pad component 546 and second outer end surface 582 of first hub component 532.

The second stop position, which may be a second mechanical stop position, limits travel of second hub component 538 relative to first hub component 532 in a second direction, rightward in FIG. 14, by way of contact between second outer end surface 582 and pad component 546. Thus, when second hub component 538 is located at the second stop position, pad component 546 contacts second outer end surface 582 and gap 563 is closed. At the second stop position, a second gap (not shown) may exist between first outer end surface 580 and inner surface 584 of second hub component 538. It may thus be appreciated that pad component contacts first hub component 532 at the second stop position, and does not contact first hub component 532 at the first stop position, in at least certain embodiments. Gear ring center axis $Y_1$ may be movable with second hub component 538 a travel distance between the first stop position and the second stop position. In certain embodiments, the travel distance may be relatively small, and may be less than about two millimeters. In some embodiments, the travel distance may be less than 1 millimeter. Relatively small travel of gear ring 540, along with mechanical stop positions as described herein, can ensure that relative timing changes between crank gear 518 and cam gear 519 when gear ring 540 translates remain within acceptable tolerances. In other embodiments, a relatively larger travel distance might be used, depending upon the particular application. It may be further noted from FIG. 14 that spring component 544 may be held in compression between pad component 546 and first hub component 532. When second hub component 538 moves from the first stop position toward the second stop position, spring component 544 may be further compressed.

Accordingly, first helical spring 550 and second helical spring 552 of spring component 544 may have a relatively greater spring length at the first stop position and a relatively lesser spring length at the second stop position.

Figure 10:
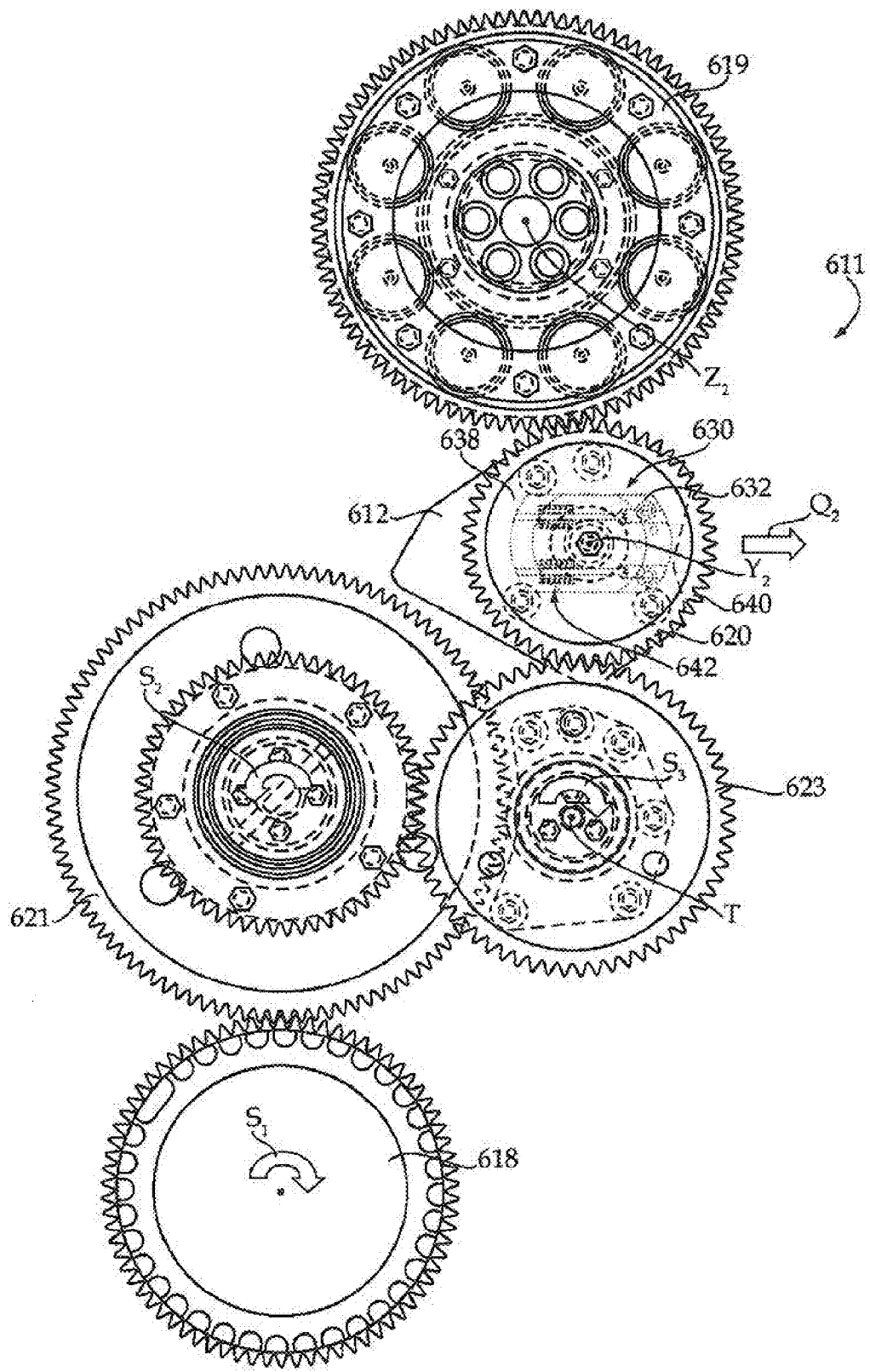
FIG. 10 is a schematic illustration of a gear train according to one embodiment.
Figure 15:
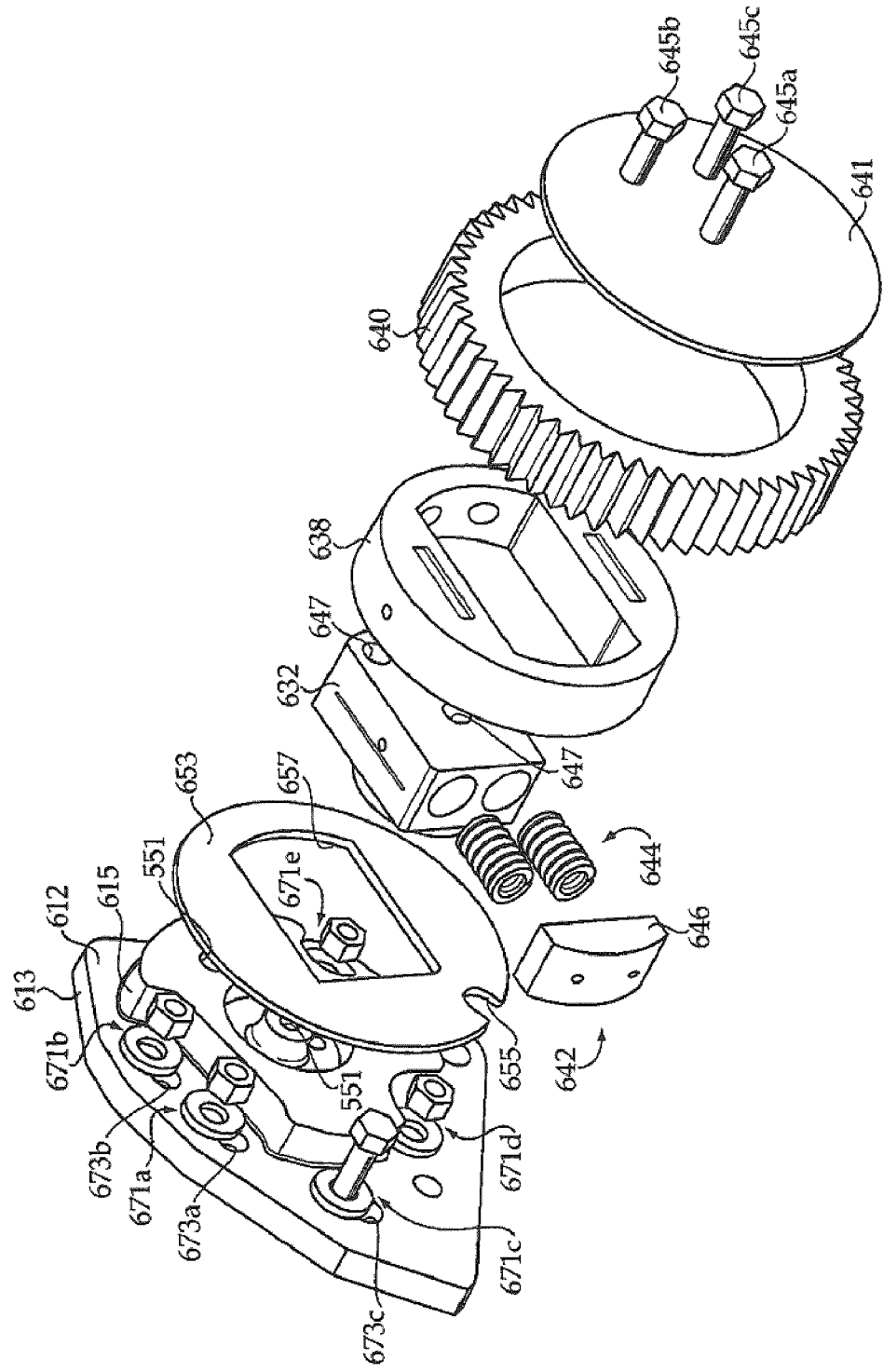
FIG. 15 is an exploded view of a gear assembly according to one embodiment.

Returning to FIG. 9, it may be noted that crank gear axis of rotation $X_1$ and cam gear axis of rotation $Z_1$ lie in and define a plane. When gear ring 540 is translated responsive to application of a torque thereon toward the second stop position, gear ring axis of rotation $Y_1$ may be moved in a direction which is normal to the plane defined by axes $X_1$ and $Z_1$. It should be appreciated that gear train 511 illustrates but one of many possible gear train configurations to which idler gear 520 and the other compliant gear assemblies described herein may be applied. Turning to FIG. 10, there is shown a gear train 611 having a different configuration, and employing an idler gear 620 having features similar to those of idler gear 520, but operating and configured in a somewhat different manner. Gear train 611 includes a crank gear 618, which is rotated in a direction shown via arrow $S_1$, a cam gear 619 defining an axis of rotation $Z_2$ and a second idler gear 621 in mesh with crank gear 618 and rotating in a direction shown via arrow $S_2$. Gear train 611 may also include a third idler gear 623 defining an axis of rotation T and rotating in a direction shown via arrow $S_3$. Idler gear 620 may include a gear ring 640 rotatable upon and rotatable about a hub subassembly 630 which includes a first hub component 632 and a second hub component 638. Referring also to FIG. 15, idler gear 620 may include a compliance mechanism 642 having a configuration similar to that of compliance mechanism 542 described above, and including a spring component 644 and a pad component 646. In gear train 611, second idler gear 621 is in mesh with crank gear 618, and third idler gear 623 is in mesh with second idler gear 621 and in mesh with first idler gear 620. An axis of rotation T defined by third idler gear 623 and axis of rotation $Z_2$ defined by cam gear 619 may define a plane. Gear ring axis of rotation $Y_2$ may be movable with second hub component 638 between a first stop position and a second stop position in a direction which is normal to the plane defined by axes T and $Z_2$.

Referring now to FIG. 15, there is shown idler gear 620 in an exploded view. Certain of the components used in idler gear 620 may be similar to or identical to components used in idler gear 520. One difference between idler gear 620 and idler gear 520 relates to the manner in which idler gear 620 may be mounted. FIG. 15 illustrates a support element 612 which includes a back portion 613 and a front portion 615 projecting outwardly from back portion 613. Support element 612 may be used to mount idler gear 620 to an engine housing, or another substrate. Support element 612 may further include a set of apertures 673a-c located in back portion 613, which each receive a fastening assembly 671a-e. In addition to apertures 673a-c, additional apertures may be formed in support element 612 which correspond to fastening assemblies 671a-e, but are obscured from view in the FIG. 15 illustration. In one embodiment, apertures 673a-c may include non-circular shapes, and in one embodiment may have oblong shapes. Fastening assemblies 671a-e may each include a fastener which is passed through a corresponding one of apertures 673a-c, to bolt support element 612 to an engine housing, other substrate, etc. The non-circular shape of apertures 673a-c can allow a position of fastening assemblies 671a-e to be varied relative to support element 612 such that a location of idler gear 620 may be adjusted relative to other gears of an associated gear train. This may be desirable where, for example, after removing components of gear train 611 from service, wear of various of the components may have occurred and an original positioning of the various components of the gear train relative to one another is no longer optimal. In addition, an engine head (not shown) may be machined when gear train 611 and an associated engine are removed from service for remanufacturing. Machining the engine head may change its dimensions, and thus change a distance between certain gears in gear train 611. It will generally be easier to compensate for wear or remanufacturing induced changes in the gear train's configuration by adjusting idler gear 620 than other gears such as crank gear 618 and cam gear 619. Thus, a mounting location of idler gear 620 may be shifted to allow an optimal relative positioning of certain components of gear train 611 by varying the relative positioning of fastening assemblies 671a-3 relative to apertures 673a-c.

Figure 16:
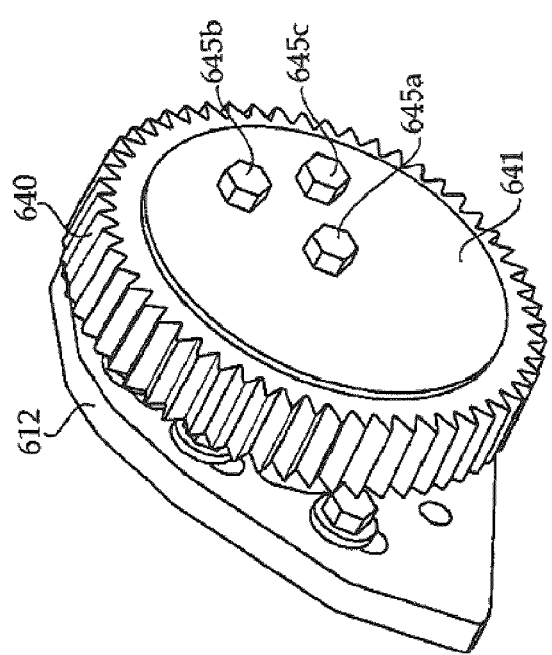
FIG. 16 is a front view of the gear assembly of FIG. 15 assembled and positioned upon a support element.

Idler gear 620 may also include a backing plate having a backing plate aperture 657 formed therein which is shaped complementarily to first hub component 632 and positionable about first hub component 632. A locating cut-out 655 may be formed in backing plate 653 to assist in locating backing plate 653 relative to support element 612. Cut-out 655 may receive fastening assembly 671d to position backing plate 653 at a desired orientation relative to support element 612. FIG. 16 illustrates idler gear 620 assembled and mounted to support element 612 in a desired orientation. A set of mounting bolts 645a-c may be passed through a cover plate 641, passed through apertures 647 formed in first hub component 632 and received in apertures 651 formed in support element 612, coupling the various components of idler gear 620 together.

Figure 17:
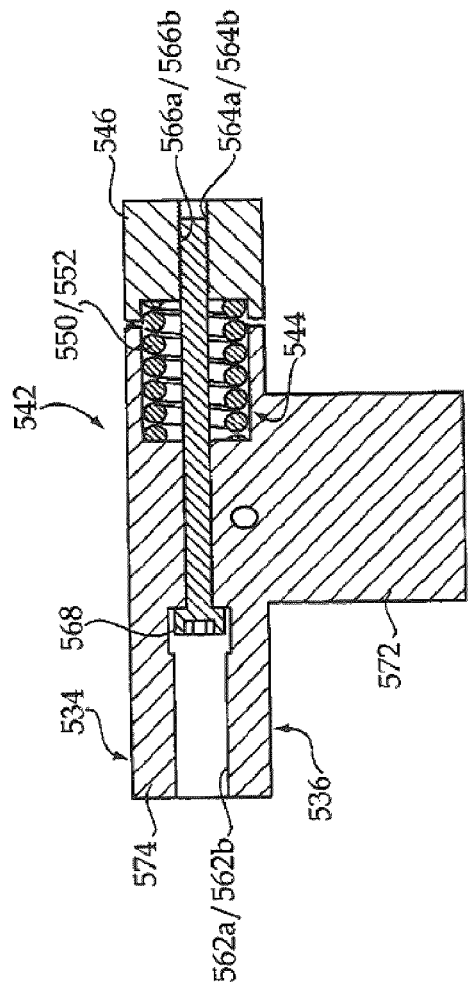
FIG. 17 is a sectioned view through a portion of a gear assembly at an assembly stage, according to one embodiment.

Referring to FIG. 17, there is shown a sectioned view through certain of the components of idler gear 520 at an assembly stage, as the components might appear in a section plane which includes either one of axes $G_1$ or $G_2$. As discussed above, springs 550 and 552 may be held in a compressed state when assembled in idler gear 520. A mechanism or strategy for loading compliance mechanism 542 into a use position between first hub component 532 and second hub component 538 with springs 550 and 552 in the compressed state is thus desirable. Referring also to FIG. 14, first hub component 532 may define a first set of assembly bores including a first counterbore 562a and a second counterbore 562b. First counterbore 562a is in communication with and coaxial with first spring bore 558a, whereas second counterbore 562b is in communication with and coaxial with second spring bore 558b. Pad component 546 defines a second set of assembly bores including a first threaded bore 564a communicating with and coaxial with third spring bore 560a and a second threaded bore 564b communicating with and coaxial with fourth spring bore 560b. First threaded bore 564a may include a first set of internal threads 566a and second threaded bore 564b may include a second set of internal threads 566b. Each of internal thread sets 566a and 566b is adapted to threadingly anchor a fastener 568 received therein by way of a corresponding one of first counterbore 562a and second counterbore 562b to compress spring component 544 between pad component 546 and first housing portion 532 during assembling idler gear 520. It will be appreciated that the depiction of a single fastener 568 in FIG. 17, and the present description, are also applicable to a second fastener, but only one is shown due to the particular section plane. Accordingly, FIG. 17 may be understood to show either of springs 550 or 552, either of counterbores 562a, 562b, etc.

In FIG. 17, fastener 568 is shown passed through the bores described above and threadingly anchored in pad component 546. Rotating fastener 568 to engage with threads 566a or 566b in a first direction will be understood to draw pad component 546 toward first hub component 532, such that spring component 544 is compressed. Rotating fastener 568 in a second direction will be understood to allow spring component 544 to decompress, urging pad component 546 away from first hub component 532. It may be noted from FIG. 14 that second hub component 538 defines yet another set of bores, each labeled 565, which are in register with counterbores 562a and 562b. During assembly, a set of two fasteners, including the single fastener 568 illustrated in FIG. 17, may be anchored in each of threaded bores 564a and 564b, then rotated to draw pad component 546 against first hub component 532, compressing each of springs 550 and 552 of spring component 544. A subassembly consisting of first hub component 532, pad component 546, spring component 544, and two fasteners including fastener 568, may then be coupled with second hub component 538 by placing the subassembly within void 584. The fasteners used to draw pad component 546 against first hub component 532 may then be accessed and removed via bores 565, allowing the biasing force of spring component 544 to urge pad component 546 away from first hub component 532. Gear ring 50 may then be positioned upon hub subassembly 530, and the other components of idler gear 520 assembled therewith. A similar assembly technique and assembly bores, etc., may be used for idler gear 620.

INDUSTRIAL APPLICABILITY

Returning to the embodiment of FIGS. 2, 3a-b and 6, during normal gear train operation, gear assembly 20 will rotate to transmit torque from crank gear 18 to cam gear 19, maintaining desired engine timing such that fuel injection and, for example, valve opening and closing, can take place at desired times. During continued operation, one or both of crank gear 18 and cam gear 19 will experience impulsive torque loads, which are transmitted to gear assembly 20. Preloading of springs 52 will typically keep gear train 11 relatively stiff, only allowing compliance via translation of gear ring 22 when gear assembly 20 is subjected to a torque load above a predetermined magnitude. When a sufficient torque, either independently from one of crank gear 18 and cam gear 19, or simultaneously from both, is applied to gear assembly 20, gear ring 22 may begin to move out of coaxial alignment with hub 26. Referring in particular to FIG. 6, translation of gear ring 22 will take place by a pad 40a sliding against a block 50a in the manner described herein. As pad 40a and block 50a slide relative to one another, spring 52 will be compressed. It should be appreciated that pad and block pairs disposed opposite one another in gear assembly 20 will slide in opposite relative directions. Translation of gear ring 22 will cease when either the torque impulse ceases, spring 52 reaches a state where it may not be further compressed, or where some mechanical limit such as a stop (not shown) causes gear ring 22 to cease its translation movement away from coaxial alignment with hub 26. In any event, when a torque of sufficient magnitude is no longer applied to gear ring 22, it will begin to return toward coaxial alignment with hub 26 via expansion of one or more of springs 52. Although by no means limited, translation distance of gear ring 22 relative to hub 26 may be relatively small, for example, about 0.60 millimeters. This relatively small translation distance may in some instances correspond to about 0.52 degrees of crank angle in engine system 10.

Gear assembly 20, described in particular with regard to FIGS. 2, 3a, 3b and 6 offers a relatively compact assembly capable of relatively easy manufacture, assembly, and packaging. Moreover, the symmetrical arrangement of the spring and block actuators about the assembly, and the interaction between diagonal surfaces on the pads and blocks provides a design that is translatable responsive to torques on the gear assembly without tipping out of its intended plane of alignment with other gears of the gear train. Moreover, while it is contemplated that the direction of translation will primarily be that illustrated with arrow A in FIG. 1, gear ring 22 may translate in any direction.

It should further be appreciated that the particular arrangement and number of components of gear assembly 20 might be varied significantly without departing from the intended spirit and scope of the present disclosure. For instance, rather than the hub and gear ring being rotatable together, embodiments are contemplated wherein a center hub is fixed relative to the engine housing, and a gear ring assembly rotates about the center hub, biased toward coaxial alignment with at least one actuator between the hub and gear ring. Moreover, a one-piece hub rather than a two piece hub might be used, and various additional components such as an idler thrust plate might be added. Similarly, rather than separate pads bolted or otherwise affixed to the gear ring inner annular portion, in turn attached to the outer toothed gear ring, a one-piece component might be used. In still further designs (not shown), rather than blocks and springs aligned with the axis of rotation of the gear assembly, springs alone might be used, oriented slightly outwardly from the gear assembly axis of rotation and abutting a surface(s) of the gear ring or gear ring subassembly that is oriented diagonally relative to the gear assembly axis of rotation. Such a design could operate in a manner analogous to that of gear assembly 20, but use relatively fewer components.

The embodiments shown in FIGS. 4 and 5 will function in a manner similar to that of gear assembly 20, with several exceptions. In gear assembly 120 of FIG. 4 and gear assembly 220 of FIG. 5, for example, springs 152 and 252 will compress without sliding interaction between components as the respective gear rings translate under the influence of a torque, then expand to return the components toward coaxial alignment.

Operation of the embodiment of FIG. 8 differs from that of the aforementioned embodiments in a number of ways, although it shares certain operating principles. During operation, gear ring 422 will rotate about hub portions 426a and 426b upon bearing 423. Gear ring 422 will be biased toward coaxial alignment with first hub portion 426a, but will translate from coaxial alignment therewith when a torque of sufficient magnitude is applied to gear ring 422. Pre-loading of springs 452 via hydraulic force may provide a relatively high threshold for translational displacement, corresponding to a relatively strong load on gear assembly 420. When gear ring 422 translates, it will in turn urge bearing 423, mounting ring 424 and second hub portion 426b to move therewith. Movement of second hub portion 426b against the bias of springs 452 will cause the leftmost fluid pressurization piston 482, as shown in FIG. 8, to pressurize fluid in chamber 478 and supply the same to cavities 459, increasing or maintaining fluid pressure therein and, hence, a hydraulic force applied via pressure surfaces 457 to pre-load springs 452. Simultaneously, the rightmost fluid pressurization piston 482 in FIG. 8 may draw fluid into cavity 478 via valve 490. When gear ring 422 returns toward a coaxially aligned position with first hub portion 426a due to the biasing force of springs 452, the operation of fluid pressurization pistons 482 may reverse. In this manner, translation of gear ring 422 can maintain fluid pressure in cavities 459, in turn providing an appropriate biasing force to bias gear ring 422 toward its desired position. As fluid pressure in cavities 459 increases, hub portions 426a and 426b will tend to be urged toward a fully separated position. Increasing fluid pressure in cavities 459 will thus tend to move sleeves 456 to positions at which annuli 468 are uncovered, and fluid can flow to drains 470. In this manner, the pre-load on springs 452 from fluid pressure in cavities 459 may be maintained within a desired range, and restored in cases where it has dropped.

Gear assembly 420 may be configured to translate relatively rapidly due to certain loads on one side, but will transfer the load less rapidly, or less impulsively, to a gear meshing on the opposite side due to its rotation and the translation of gear assembly 420 induced by the loading. Thus, gear assembly 420 will allow crank gear 419 and/or cam gear 418 to go through their respective dynamic oscillations with significantly reduced force interaction with one another through the gear train than in conventional designs. A relatively powerful torque shock from one of gears 418 or 419 will be attenuated as it is transferred to the other of gears 418 and 419, allowing the inertias of the gears 418 and/or 419 to accommodate the loading without significant backlash or other undesirable responses. This allows the crankshaft and camshaft to undergo dynamic oscillations generally independently of one another.

Gear assembly 420 may have a natural frequency, i.e. of one hub portion translating relative to another, that will effectively track the frequencies imparted by gears 418 and 419. However, due to the relatively soft spring rate of springs 452, springs 452 can accommodate relatively rapid displacements without the components of gear assembly 420 moving substantially under short-lived changes in support force from springs 452. In other words, given their spring rate, springs 452 can accommodate strong, impulsive loads without requiring that other components of gear assembly 420 move significantly. This allows a relatively small amount of translation between hub portions 426a and 426b to accommodate relatively large loads.

The role of gear assembly 420 may thus be as a relatively light and responsive idler gear which can accommodate the motions and impulses of the other gears, but without transmitting problematic impulses through gear train 411. As a result, the steady state or "normal" load transferred across gear assembly 420 may be the load required to transfer sufficient energy from crank gear 418 to cam gear 419 to keep the speed of cam gear 419 at a desired speed.

Further, applying pre-load to springs 452 via pistons 458 provides for sufficient spring force to bias gear assembly 420 as desired, and limits translation between hub portions 426a 426b under loads where translation is not desired. The pre-load of springs 452 may result in a torque pre-load for gear assembly 420 of about 150 Newton-meters, for example, although in other engine and gear train systems this value may differ. The combination of a relatively soft spring rate for springs 452 with sufficient reaction force provided by their pre-loading allows a more regular torque to be passed through gear train 411, via shaving of the peaks off of high, impulsive torques from the associated cam and crank shafts. Moreover, the hydraulic pressure necessary to provide sufficient spring force via force on pistons 458 from cavities 459 is provided by the pumping action of pistons 482. In this manner, gear assembly 420 is self-compensating, utilizing translational motion of gear ring 22, transmitted to pistons 482, to provide a biasing force that is capable of returning gear ring 422 toward its desired coaxial position following its translation responsive to impulsive loads.

Gear assembly 420 will thus typically be configured to translate relatively freely responsive to dynamic loading frequencies, providing compliance in gear train 411 when needed, but the hydraulics will allow canceling out of displacements at frequencies associated with a mean load, allowing those loads to be transmitted through gear assembly 420. In other words, desired torques may be readily transmitted through gear assembly 420, whereas undesired torques are less easily transmitted. The design of gear assembly 420 is further contemplated to be implemented within existing packaging constraints, and the use of hydraulic force to pre-load springs 452 obviates the need for positioning very highly compressed springs within the assembly. In other embodiments, however, the hydraulic compensation means might be dispensed with and some other type of pre-loading used for springs 452.

Idler gear 520 and idler gear 620 may operate to smooth out and/or attenuate torque fluctuations/spikes in a manner having similarities with other embodiments described herein, but with certain differences. Similar to the embodiment of FIG. 8, gear ring axes of rotation $Y_1$ and $Y_2$ may be translated between a first stop position and a second stop position, and may be biased toward the first stop position. Rather than a preloading mechanism using both springs and hydraulic preload, as is used in the embodiment of FIG. 8, preloading of compliance mechanisms 542 and 642 may not include hydraulic preloading. Thus, no pumping action for hydraulic fluid will typically take place via movement of idler gears 520 and 620. Moreover, a relatively more compact design, using a fewer total number of parts may be used in idler gears 520 and 620 than in other embodiments. Assembly of idler gears 520 and 620 may also be different from other embodiments described herein, as well as earlier designs, and may occur with a relatively small number of assembly steps. Preloading relatively stiff springs to relatively high preloads of typically hundreds of pounds creates certain challenges. It may be noted from the descriptions herein of assembling idler gear 520 that no special tools, fixturing or other unwieldy and/or expensive or time consuming techniques need be used to attain a desired preload on spring component 544, and assemble compliance mechanism 542 in a preloaded state with other components of idler gear 520. Analogous capabilities exist for idler gear 620.

The present disclosure thus provides various designs for gear assemblies configured to use translational motion to attenuate impulsive loads. This contrasts with conventional strategies which use rotational compliance directed to similar goals. The present disclosure is further distinct from earlier designs seeking to address dynamic behavior close to the sources of excitation, i.e. the cam gear and crank gear in the context of an engine gear train. Many conventional gear trains tend to be quite stiff to begin with and, hence, the relatively modest amount of gear translation in the direction of mesh forces between the gears can significantly reduce the peak force levels at the gear teeth by attenuating the transfer of energy between and among the gears. In systems designed and operated according to the present disclosure, gear rattle, noise and the associated wear and tear on gear trains is reduced. Peak torques and overall dynamic activity in a gear train may also be substantially reduced, and gear teeth can be better maintained in mesh with one another. In some embodiments existing gear trains may be retrofitted with the compliant gear assemblies of the present disclosure. In others, a gear train or engine may be originally designed and built in accordance with the present disclosure.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while the present description is largely focused on the use of the described compliant gear assemblies in the context of an engine gear train, the present disclosure is not thereby limited. Any gear system wherein some compliance between meshing gears is desirable may benefit from the teachings of the present disclosure. Still further, while maintaining timing between a crank gear and cam gear tends to be relatively important in the context of an internal combustion engine, and hence, compliant gear assemblies are considered to be applicable to engines having certain gear train configurations, the present description should not be considered to limit application of the teachings herein to any particular gear train pattern. Other aspects, features and advantages will be apparent upon an examination of the attached drawings and appended claims.

What is claimed is:

1. A compliant gear assembly comprising:
a hub subassembly which includes a first hub component adapted for mounting the compliant gear assembly to a support element, the first hub component including a front face and a back face and defining a first axis which extends through the first hub component and is oriented normal to the front face, the hub subassembly further including a second hub component which is movable relative to the first hub component in a direction perpendicular to the first axis between a first stop position and a second stop position;
a gear ring mounted upon the hub subassembly and rotatable relative to the hub subassembly, the gear ring defining a gear ring axis of rotation and being coupled to move with the second hub component between the first stop position and the second stop position, wherein at the first stop position the gear ring axis of rotation is co-linear with the first axis and at the second stop position the gear ring axis of rotation is parallel to but not co-linear with the first axis; and
a compliance mechanism coupled between the first hub component and the second hub component and including a pad component, and a first and a second helical spring, biasing the second hub component toward the first stop position; each of the first helical spring and the second helical spring includes an inboard spring end and an outboard spring end; the first hub component defines a first spring bore receiving the inboard spring end of the first helical spring and a second spring bore receiving the inboard spring end of the second helical spring; each of the outboard spring ends contacting the pad component such that the pad component transmits a biasing force of the first and second helical springs to the second hub component.

2. The compliant gear assembly of claim 1 wherein the pad component defines a third and a fourth spring bore receiving the outboard spring ends of the first and second helical springs, respectively, and transmits the biasing force in a biasing force direction normal to the first axis.

3. The compliant gear assembly of claim 2 wherein the pad component contacts the first hub component at the second stop position and does not contact the first hub component at the first stop position.

4. The compliant gear assembly of claim 3 wherein the gear ring axis of rotation is movable with the second hub component a travel distance between the first stop position and the second stop position responsive to application of a torque on the gear ring, and wherein the travel distance is less than 2 millimeters.

5. The compliant gear assembly of claim 3 wherein the first helical spring defines a first longitudinal spring axis and the second helical spring defines a second longitudinal spring axis, and wherein the first longitudinal spring axis and the second longitudinal spring axis are oriented parallel to one another but are not co-linear.

6. The compliant gear assembly of claim 2 wherein:
the first hub component includes a block element which includes the front face and the back face, and a mounting projection extending from the back face of the block element in a direction aligned with the first axis, the first hub component further having an outer peripheral surface extending between the front face and the back face which includes a first outer guide surface, a second outer guide surface, a first outer end surface and a second outer end surface;
the second hub component includes an inner surface defining a void wherein the block element and the compliance mechanism are positioned, the inner surface including a first inner guide surface abutting the first outer guide surface and a second inner guide surface abutting the second outer guide surface; and
the first stop position is a first mechanical stop position limiting travel of the second hub component relative to the first hub component in a first direction by way of contact between the first outer end surface and the inner surface of the second hub component, and the second stop position is a second mechanical stop position limiting travel of the second hub component relative to the first hub component in a second direction by way of contact between the second outer end surface and the pad component.

7. A compliant gear assembly comprising: a hub subassembly which includes a first hub component adapted for mounting the compliant gear assembly to a support element, the first hub component including a front face and a back face and defining a first axis which extends through the first hub component and is oriented normal to the front face, the hub subassembly further including a second hub component which is movable relative to the first hub component in a direction perpendicular to the first axis between a first stop position and a second stop position; a gear ring mounted upon the hub subassembly and rotatable relative to the hub subassembly, the gear ring defining a gear ring axis of rotation and being coupled to move with the second hub component between the first stop position and the second stop position, wherein at the first stop position the gear ring axis of rotation is co-linear with the first axis and at the second stop position the gear ring axis of rotation is parallel to but not co-linear with the first axis; and a compliance mechanism coupled between the first hub component and the second hub component and biasing the second hub component toward the first stop position; wherein: the compliance mechanism includes a spring component and a pad component separate from the spring component, the pad component transmitting a biasing force of the spring component to the second hub component in a biasing force direction normal to the first axis; the pad component contacts the first hub component at the second stop position and does not contact the first hub component at the first stop position; the spring component includes a first helical spring defining a first longitudinal spring axis and a second helical spring defining a second longitudinal spring axis, and wherein the first longitudinal spring axis and the second longitudinal spring axis are oriented parallel to one another but are not co-linear; each of the first helical spring and the second helical spring includes an inboard spring end and an outboard spring end; the first hub component defines a first spring bore receiving the inboard spring end of the first helical spring and a second spring bore receiving the inboard spring end of the second helical spring; the pad component defines a third spring bore receiving the outboard spring end of the first helical spring and a fourth spring bore receiving the outboard spring end of the second helical spring; and the first spring bore is coaxial with the third spring bore and the fourth spring bore is coaxial with the second spring bore.

8. The compliant gear assembly of claim 7 wherein:
the first hub component defines a first set of assembly bores including a first counterbore communicating with and coaxial with the first spring bore and a second counterbore communicating with and coaxial with the second spring bore; and
the pad component defines a second set of assembly bores including a first threaded bore communicating with and coaxial with the third spring bore and a second threaded bore communicating with and coaxial with the fourth spring bore; and
each one of the first threaded bore and the second threaded bore includes a set of internal threads adapted to threadingly anchor a fastener received therein by way of one of the first counterbore and the second counterbore to compress the spring component between the pad component and the first housing portion during assembling the compliant gear assembly.

9. An internal combustion engine comprising:
an engine housing;
a gear train mounted to the engine housing and including a crank gear, a cam gear and an idler gear coupled between the crank gear and the cam gear and configured to transmit a torque between the crank gear and the cam gear;
the idler gear including a first hub component mounting the idler gear to the engine housing and including a front face and a back face and defining a first axis which extends through the first hub component and is oriented normal to the front face, the idler gear further including a second hub component movable in a direction perpendicular to the first axis between a first stop position and a second stop position, and a gear ring defining a gear ring axis of rotation; and
the gear ring being coupled to move with the second hub component between the first stop position at which the gear ring axis of rotation is co-linear with the first axis and the second stop position at which the gear ring axis of rotation is parallel to but not co-linear with the first axis, and the idler gear further including a compliance mechanism coupled between the first hub component and the second hub component and including a pad component, and a first and a second helical spring, biasing the second hub component toward the first stop position; each of the first helical spring and the second helical spring includes an inboard spring end and an outboard spring end; the first hub component defines a first spring bore receiving the inboard spring end of the first helical spring and a second spring bore receiving the inboard spring end of the second helical spring; each of the outboard spring ends contacting the pad component such that the pad component transmits a biasing force of the first and second helical springs to the second hub component.

10. The internal combustion engine of claim 9 wherein the second hub component includes an inner surface defining a void wherein the first hub component, the spring component and the pad component are positioned.

11. The internal combustion engine of claim 10 wherein the first stop position is a first mechanical stop position limiting travel of the second hub component relative to the first hub component in a first direction by way of contact between the first hub component and the inner surface of the second hub component, and the second stop position is a second mechanical stop position limiting travel of the second hub component relative to the first hub component in a second direction by way of contact between the first hub component and the pad component.

12. The internal combustion engine of claim 10 wherein the first and second helical springs have a relatively greater spring length at the first stop position and a relatively lesser spring length at the second stop position.

13. The internal combustion engine of claim 12 wherein the first helical spring defining a first longitudinal spring axis and the second helical spring defining a second longitudinal spring axis which is parallel to but not co-linear with the first longitudinal spring axis, and each of the first longitudinal spring axis and the second longitudinal spring axis having an orientation normal to the first axis.

14. The internal combustion engine of claim 9 wherein the crank gear defines a crank gear axis of rotation and the cam gear defines a cam gear axis of rotation, the crank gear axis of rotation and the cam gear axis of rotation defining a plane and the gear ring axis of rotation being movable with the second hub component between the first stop position and the second stop position in a direction which is normal to the plane.

15. The internal combustion engine of claim 14 wherein the idler gear is in mesh with the cam gear and the crank gear.

16. The internal combustion engine of claim 9 wherein the idler gear includes a first idler gear, the gear train further including a second idler gear in mesh with the crank gear and a third idler gear in mesh with the second idler gear and in mesh with the first idler gear, wherein the third idler gear defines a third idler gear axis of rotation and the cam gear defines a cam gear axis of rotation, the third idler gear axis of rotation and the cam gear axis of rotation defining a plane and the gear ring axis of rotation being movable with the second hub component between the first stop position and the second stop position in a direction which is normal to the plane.

* * * * *